United States Patent [19]
Crouse et al.

[11] Patent Number: 5,764,972
[45] Date of Patent: Jun. 9, 1998

[54] ARCHIVING FILE SYSTEM FOR DATA SERVERS IN A DISTRIBUTED NETWORK ENVIRONMENT

[75] Inventors: Donald D. Crouse, Murphy, Tex.; Harriet G. Coverston, New Brighton, Minn.; Joseph M. Cychosz, W. Lafayette, Ind.

[73] Assignee: LSC, Inc., Minneapolis, Minn.

[21] Appl. No.: 481,924

[22] Filed: Jun. 7, 1995

Related U.S. Application Data

[63] Continuation of Ser. No. 12,298, Feb. 1, 1993, abandoned.
[51] Int. Cl.$^6$ .................................................. G06F 17/30
[52] U.S. Cl. ........................ 395/601; 395/610; 395/620
[58] Field of Search ..................... 364/DIG. 1, DIG. 2; 395/600, 700, 601, 610, 620

[56] References Cited

U.S. PATENT DOCUMENTS

| 4,827,399 | 5/1989 | Shibayama | 364/200 |
|---|---|---|---|
| 4,887,204 | 12/1989 | Johnson et al. | 364/200 |
| 4,888,681 | 12/1989 | Barnes et al. | 364/200 |
| 4,972,368 | 11/1990 | O'Brien et al. | 364/900 |
| 5,014,197 | 5/1991 | Wolf | 364/200 |
| 5,077,658 | 12/1991 | Bendert et al. | 395/600 |
| 5,133,065 | 7/1992 | Cheffetz et al. | 395/575 |
| 5,146,561 | 9/1992 | Carey et al. | 364/200 |
| 5,151,989 | 9/1992 | Johnson et al. | 395/600 |
| 5,163,131 | 11/1992 | Row et al. | 395/200 |
| 5,187,786 | 2/1993 | Densmore et al. | 395/600 |

FOREIGN PATENT DOCUMENTS 476 841  3/1992  European Pat. Off. .

OTHER PUBLICATIONS

Microsoft Press Computer Dictionary, 2nd Edition, 1993, pp. 25 & 35.
Bach, M. *The Design of the UNIX® Operating System*, (1986), Prentice-Hall, Chpts. 3-5 pp. 33-145.
Leffler, McKusich, Karels and Quarterman, *The Design and Implementation of the 4.3 B50 UNIX® Operating System*, (1990) Chpt. 7, pp. 187-223.

Kochan, S. *UNIX® Networking*, Chpts. 4 & 7 (1989) Hayden Books, pp. 93-132 and 203-235.

Kleiman, S., "Vnodes: An Architecture for Multiple File System Types in Sun UNIX", *Conference Proceedings, USENIX 1986 Summer Technical Conference and Exhibition*, pp. 238-246.

Sandberg, R. et al. "Design and Implementation of the Sun Network File System", *Conference Proceedings USENIX, 1985*, pp.119-130.

"The Uni-Tree™ Virual Disk System: An Overview" General Atomics/Discos Division (1991).

"Epoch-1 Infinite Storage™ Storage Server Technical Summary", Epoch Systems, Inc. Rev. II, (Jul. 1990).

Montgomery, J. "Product Review: Silicon Graphics 4D/400 Server", *Digital Review*, Sep. 9, 1991.

*Primary Examiner*—Thomas G. Black
*Assistant Examiner*—Maria N. Von Buhr
*Attorney, Agent, or Firm*—Patterson & Keough, P.A.

[57] ABSTRACT

An archiving file system is specifically designed to support the storage of, and access to, remote files stored on high speed, large capacity network data servers. The archiving file system automatically archives remote files across multiple types of secondary storage media on such network data servers based on a set of hierarchically selectable archival attributes selectively assigned to each remote file. The archiving file system is completely transparent to the user program and operates on remote files by providing a different file control program and a different file structure on the network data server, without the need to modify the standard file system that is native to a particular operating system program executing on the user nodes or the standard network file interfaces executing on the distributed computer network environment.

17 Claims, 20 Drawing Sheets

ARCHIVING FILE SYSTEM FOR DATA SERVERS IN A DISTRIBUTED NETWORK ENVIRONMENT

This is a continuation of application Ser. No. 08/012,298, filed Feb. 1, 1993, now abandoned.

RELATED APPLICATIONS

This application is related to the following co-pending applications, filed concurrently herewith and assigned to the same assignee, entitled:

METHOD AND APPARATUS FOR STORAGE ALLOCATION FOR SECONDARY STORAGE SYSTEMS, Ser. No. 08/012,029, filed Feb. 1, 1993 now U.S. Pat. No. 5,454,103;

METHOD AND APPARATUS FOR FILE RECOVERY FOR SECONDARY STORAGE SYSTEMS, Ser. No. 08/012,030, filed Feb. 1, 1993; now U.S. Pat. No. 5,504,883 and METHOD AND APPARATUS FOR PIPELINED DATA SERVER HAVING IMPROVED DATA TRANSFER, Ser. No. 08/011,966, filed Feb. 1, 1993 now U.S. Pat. No. 5,394,526;

copies of which are attached hereto and the disclosure of each of which is hereby incorporated by reference.

TECHNICAL FIELD

The present invention relates generally to secondary storage systems, such as disk drives, tape drives and the like, for computer processing systems. More particularly, the present invention relates to a file system for a network data server that automatically manages the long-term storage and retrieval of large volumes of data as part of a network data server across multiple types of secondary storage media.

BACKGROUND OF THE INVENTION

The use of secondary storage systems to provide for online storage for computer processing systems that is separate from the primary or main memory of the computer processing system is well known. Examples of current secondary storage systems include magnetic disk drives, optical disk drives, magnetic tape drives, solid state disk drives and bubble memories. Typically, secondary storage systems have much larger memory capacities than the primary memory of a computer processing system; however, the access to data stored on most secondary storage systems is sequential, not random, and the access rates for secondary storage systems can be significantly slower than the access rate for primary memory. As a result, individual bytes of data or characters of information are usually stored in a secondary storage system as part of a larger collective group of data known as a file.

Generally, files are stored in accordance with one or more predefined file structures that dictate exactly how the information in the file will be stored and accessed in the secondary storage system. In most computer processing systems, the operating system program will have a file control program that includes a group of standard routines to perform certain common functions with respect to reading, writing, updating and maintaining the files as they are stored on the secondary storage system in accordance with the predefined file structure that organizes the storage of both control information and data information. Thus, when a user program executes one of these file functions, such as a read or write, the user program will actually invoke one of the standard routines in the file control program that then performs the actual file system function. In this way, the user program is insulated from the specific details of the file control program and the predefined file structure, and a more transparent interface to the secondary storage system is presented to the user program. As used within the present invention, the term file system will refer collectively to the file structure and file control program. Examples of current file systems for the System V operating system program include the, Unix® System V, Release 3 file system, the Berkeley BSD 4.2 file system and the combined Unix® System V, Release 4 and Berkeley BSD 4.3 Fast File System which is the current standard file system for the latest release of the System V operating system program. For a general background on System V file systems, reference is made to Bach, M., *The Design of the Unix® Operating System*, (1986), Prentice Hall, Chpts. 4–5, pp. 60–145; and Leffler, McKusich, Karels and Quarterman, *The Design and Implementation of the 4.3 BSD Unix® Operating System*, (1990), Chpt. 7, pp. 187–223.

In a traditional computer processing system that is not networked, the secondary storage system is directly connected to the computer processor(s), and the user program uses the same procedures in the file system to access all files stored on the secondary storage system. In a distributed computer network environment, however, the user program must be able to access both local files, i.e. files stored on secondary storage systems directly connected to the computer processor, as well as remote files, i.e., files stored on secondary storage systems that are accessed via a distributed network. To accommodate this need to allow user programs to access both local and remote files in a distributed computer network environment, certain standardized remote file access capabilities have been added as an additional software interface layer on top of the traditional file control program. Examples of remote file interfaces for a distributed computer network environment using the System V operating system include: Network File System (NFS) and Remote File System (RFS). For a general background on remote file access in networked computer processing systems, reference is made to IKochan, S., *Unix® Networking*, Chpts. 4 and 7 (1989) Hayden Books, pp. 93–132 and 203–235.

As the popularity of distributed computer networks has increased, the demand to store ever increasing volumes of data as remote files has also increased. In response to this demand, a number of remote secondary storage systems have been developed primarily for the purpose of storing remote files. These secondary storage systems, known as data servers, file servers or information servers, are not connected to an individual computer like a traditional secondary storage device; rather they are connected to the distributed network itself. Examples of current large capacity data servers for a distributed computer network environment using the System V operating system include: the Epoch-1 InfiniteStorage™ Server available from Epoch Systems, Inc., Westborough, Mass.; the UniTree™ Virtual Disk System available from General Atomics/DISCOS Division, San Diego, Calif.; and the Auspex NS 5000™ Network Server available from Auspex Systems, Inc., Santa Clara, Calif.

Although many network data servers have specialized hardware that improves the performance and capacity of the networked secondary storage system, most current network data servers for a System V-based network environment use the standard System V file systems to control the storage of remote files on the data server. As a result, these network data servers are limited in their ability to store, manipulate and access remote files to only those techniques and procedures that are generally supported by the standard file systems. Unfortunately, the standard file systems were originally designed to store files on local secondary storage systems, not remote secondary storage systems connected to many different user nodes on a distributed computer network. Consequently, most data servers have modified the standard remote file interface which executes on the data server in order to service the unique requirements of a remote secondary storage system operating in a distributed network environment. In the UniTree™ Virtual Disk System, for example, there is no file system in the data server. Instead, a program that is directly integrated with the NFS remote file interface manages the storage of data on the remote secondary storage system as a stream of raw, byte-oriented data; rather than as a set of files stored as blocks of data. As a result, the data stored by this system cannot be read by any other computer system without using the UniTree™ Virtual Disk System to recover the raw, byte-oriented data into standard block-oriented files. In addition, it is not possible to run a standard NFS data server on the same network as a UniTree™ Virtual Disk System.

Another major drawback to current standard file systems is their inability to support the archiving of files from online media secondary storage devices, such as magnetic disk drives, to removable media secondary storage devices, such as optical disk and magnetic tape. Even with the tremendous amount of data that can be stored on current network data servers, network system administrators are constantly faced with the problem of how to most efficiently manage the secondary storage space on the network. One of the primary ways to free up available space on the more expensive, but more quickly accessible, online media secondary storage devices is to archive selected remote files to less expensive, but less easily accessible, removable secondary storage devices.

Most data servers either rely on individual users to manually perform back up of remote files or use some type of least-recently used archival algorithm whereby all remote files that have not been accessed for a given period of time are archived to removable secondary storage devices when the amount of available secondary storage space falls below some minimum amount. Unfortunately, neither of these techniques provides for an intelligent or reliable archiving of remote files. Those data servers that have individual users manually back up files usually end up requiring some type of network administrator intervention whenever the amount of available secondary storage space falls below the required minimum amount to effectively operate the network data server because users cannot be relied on to consistently back up and then remove inactive remote files. On the other hand, those data servers that automatically archive remote files that have not been accessed for a given period of time blindly apply the archiving algorithm to all remote files and end up being unable to accommodate, for example, online storage of large or very large remote files that must be quickly accessed at all times, but may have certain periods of inactivity.

Future network data servers must also be able to accommodate continuing improvements in distributed network environments and ever increasing user demands. Improvements in high speed networks, such as the new FDDI and Fiber Channel standards, will significantly increase the speed at which remote files can be transferred across a distributed network. Increasing remote data storage demands, such as the need to support multimedia data comprised of the simultaneous storage and transfer of digitized voice data, video and audio, will also significantly expand the use of network data servers. Again, the standard file systems are not designed to efficiently accommodate the significantly increased speed or use of distributed networks and network data servers that will be required to support the visualization of multi-media files in a distributed network environment.

While the current standard file systems have been adequate for controlling the storage and access to local files, it would be desirable to provide a file system that automatically manages the long-term storage and retrieval of large volumes of data as part of a network data server across multiple types of secondary storage media. It also would be advantageous to provide a file system for network data servers that is specifically designed to efficiently and reliably control the storage and access of remote files on remote secondary storage systems, and can provide for the flexibility to support future developments that will increase the speed and usage of distributed computer network environments.

SUMMARY OF THE INVENTION

The present invention is an archiving file system that is specifically designed to support the storage of, and access to, remote files stored on high speed, large capacity network data servers. The archiving file system of the present invention automatically archives remote files across multiple types of secondary storage media on such network data servers based on a set of hierarchically selectable archival attributes that are selectively assigned to each remote file. The archiving file system is designed to accommodate both small and large remote files, as well as both small and large numbers of remote files, and to efficiently and reliably control the long-term storage of and access to remote files stored on network data servers. The archiving file system is completely transparent to the user program and operates on remote files by providing a different file control program and a different file structure on the network data server, without the need to modify the standard file system that is native to a particular operating system program executing on the user nodes or the standard network file interfaces executing on the distributed computer network environment.

The archiving file system of the present invention comprises a unique archiving file structure for logically storing the remote files on the secondary storage device and a novel archiving file control program executing in the network data server that controls the access to the remote files stored according to the archiving file structure. Part of the archiving file structure is a flexible control structure that is used for storing control information about the remote files as part of an addressable control file that has space on the data server that is dynamically allocated in the same manner in which space is allocated for any other remote file. The control structure also stores the set of hierarchically selectable archival attributes and one or more archival blocks associated with each remote file that automatically control the manner in which that remote file will be stored and ultimately archived, or even removed, from the network data server. The archiving file control program automatically manages the storage of and access to the remote files on multiple types of secondary storage media that are part of the network data server. The archiving file control program even allows for direct access to remote files which have been archived onto a long-term randomly positionable, removable secondary storage device without the need to first stage the archived file onto an online short-term direct access secondary storage device before the remote file can be accessed by a user program.

By providing for a set of hierarchically selectable archival attributes associated with each remote file, the archiving file system allows user programs to specify how a remote file will be managed on a network data server, or to rely on default specifications for how the remote file will be managed on the network data server as specified by a site administrator, for example. Some of the file management features supported by the archiving file system and controlled by the archival attributes stored for each remote file include: a file lifespan attribute, a file cycle attribute, and a file archive media attribute. The file lifespan attribute defines the length of time after which a remote file will be automatically deleted from the network data server. The file cycle attribute defines the number of versions of a remote file which will be created and maintained on the network data server each time a new version of the remote file is stored. The file archive media attribute defines the type of secondary storage media on which the data server will automatically archive a remote file.

Another feature supported by the archiving file system of the present invention is that the online direct access secondary storage devices of a network data server can be organized and controlled as storage family sets. Each storage family set comprises a plurality of physically unique direct access storage devices that are collectively accessed by the archiving file system on a block-by-block basis in, for example, a round robin fashion. In this way, the archiving file system of the present invention automatically implements software striping by arranging a plurality of blocks that comprise a remote file to be stored on the network data server such that selected ones of the blocks are stored in their entirety on separate ones of the physically unique direct access storage devices that comprise the storage family set. The archiving file system can also implement software shadowing on a storage family set in order to selectively store a shadow copy of a remote file on a separate group of direct access secondary storage devices. The software shadowing is accomplished by partitioning the storage family set into a pair of storage family subsets, each storage family subset having an equal number of secondary storage devices, and automatically storing the plurality of blocks comprising the remote file on both pairs of storage family subsets.

Still another feature supported by the archiving file system of the present invention is the improved management of cache buffers and data transfers within the network data server. Unlike current file systems which cache blocks of data in a cache buffer and then access those blocks of data using a series of hash tables to search a link list of block entries stored in the cache buffer, the archiving file system of the present invention modifies the extent array pointer used by the file system to reflect whether the block of data is presently stored in a cache buffer. If a block of data is presently stored in a cache buffer, then the archiving file system substitutes a pointer that points directly to the cache buffer, rather than pointing to the logical block address on the secondary storage device. In the preferred embodiment of the data server, the archiving file system also manages the transfer of data within the data server so as to minimize the number of transfers of data across a common bus within the data server. This eliminates the need for duplicate transfers of information within the data server of the preferred embodiment, thereby significantly increasing the overall transfer speed of the data server.

Accordingly, it is a primary objective of the present invention to provide an archiving file system that can automatically manage the long-term storage and retrieval of large volumes of data as part of a network data server across multiple types of secondary storage media.

It is another primary objective of the present invention to provide an archiving file system that is specifically designed to efficiently and reliably control and manage the long-term storage and retrieval of large volumes of data as part of a network data server in a distributed computer network environment, yet is completely transparent to the user program.

An objective of the present invention is to provide an archiving file system with a flexible control structure for storing control information about remote files as part of an addressable control file that has space on the data server that is dynamically allocated in the same manner in which space is allocated for any other remote file.

Another objective of the present invention is to provide an archiving file system that stores a set of hierarchical attributes associated with each remote file for automatically controlling the manner in which that remote file will be stored and ultimately archived, or even removed, from the network data server.

Still another objective of the present invention is to provide an archiving file system that can implement software shadowing and software striping on a storage family set comprised of a plurality of physically unique direct access storage devices that are collectively accessed on a block-by-block basis.

A further objective of the present invention is to provide an archiving file system that operates on remote files by executing only in a networked data server, without the need to modify the standard file system that is native to a particular operating system program executing on the user nodes or the standard network file interfaces executing on the distributed computer network environment.

A still further objective of the present invention is to provide an archiving file system that allows for direct access to remote files which have been archived onto a long-term randomly positionable, removable secondary storage device without the need to first stage the archived file onto an online direct access secondary storage device before the remote file can be accessed by a user program.

Another further objective of the present invention is to provide an archiving file system that more efficiently manages the use of cache buffers for caching blocks of data and eliminates duplicate transfers of data within a network data server.

These and other objectives of the present invention will become apparent with reference to the drawings, the detailed description of the preferred embodiment and the appended claims.

DETAILED DESCRIPTION OF THE PREFERRED EMBODIMENT

Figure 1:
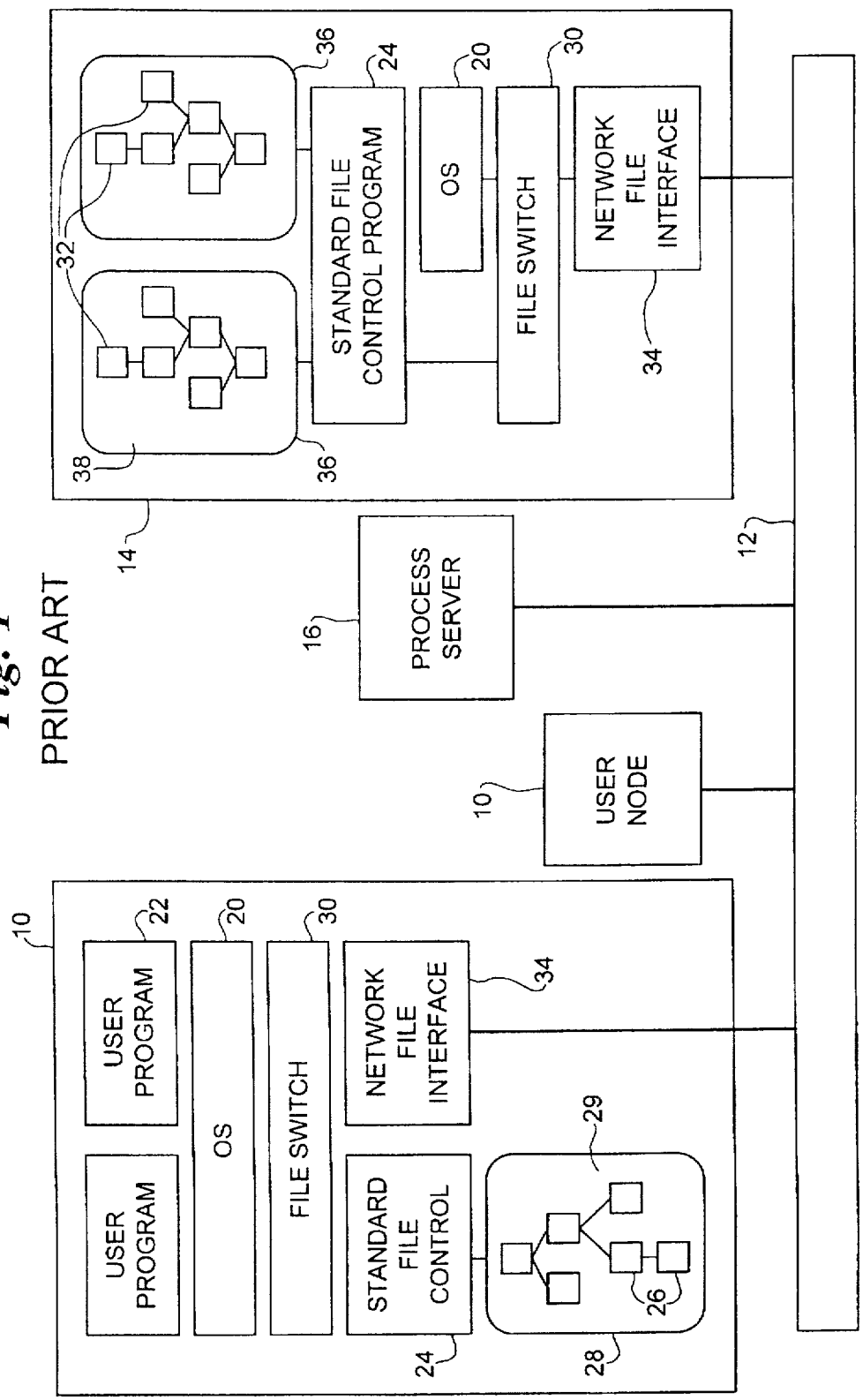
FIG. 1 is a block diagram of a prior art file system in a computer network environment.

Referring now to FIG. 1, a block diagram of a prior art file system in a computer network environment is shown. A typical computer network environment will include a plurality of user nodes 10, such as workstations, graphics terminals or personal computers, which are connected via a network 12 to one or more data servers 14 and/or process servers 16. Each user node 10 executes an operating system program 20 that services all of the system requests, such as input/output calls, from one or more user programs 22. Normally, the operating system program 20 includes a standard file control program 24 that handle all of the input/output calls to local files 26 stored on a secondary storage system 28 that is directly connected to the user node 10. In a distributed computer network environment, the operating system program 20 typically includes a file switch mechanism 30 for allowing user programs 22 access to remote files 32 stored elsewhere on the network 12 via a network file interface 34. A similar network file interface 34 within the data server 14 accepts requests from the network 12 to access a remote file 32 stored on that data server 14. In those prior art systems that implement a block-based, file-oriented management of the secondary storage system, the data server 14 executes the same operating system program 20 to decodes the requests and uses the same file switch mechanism 30 and standard file control program 24 to manage the storage and access of the remote files 32 on the secondary storage systems 36 that are part of the data server 14.

Both the remote files 32 stored on the remote secondary storage system 36 and the local files 26 stored on the local secondary storage system 28 are stored and accessed in accordance with a file system tree structure, such as shown at 38 for the remote files 32 and at 29 for the local files 26. The file system tree structure 29, 38 is organized as a file tree with a single root node that is root directory. Every non-leaf node of the file tree 29, 38 is a directory or subdirectory of files, and files at a leaf node of the file tree 29, 38 are either empty directories, regular files, or special files. In the prior art standard file system, the entire contents of a particular file tree 29, 38 must be stored on the same physical secondary storage device 28, 36, although a single physical secondary storage device 28, 36 may provide storage for two or more file trees 29, 38. Typically, the operating system program 20 will issue a mount command to the standard file control program 24 for a particular file tree 29, 38 in order to allow the user programs 22 at a particular user node 10 to have access to all of the files 26, 32 stored under that particular file tree 29, 38. In some prior art references, the file trees 29, 38 are sometime referred to as a file system. To avoid confusion in the description of the present invention, the manner in which files and directories are organized on secondary storage systems from the perspective of the user program 22 will be referred to as a file tree, whereas the file control program together with the file structures for logically organizing and accessing the file trees by the file control program will be referred to collectively as a file system.

Figure 2:
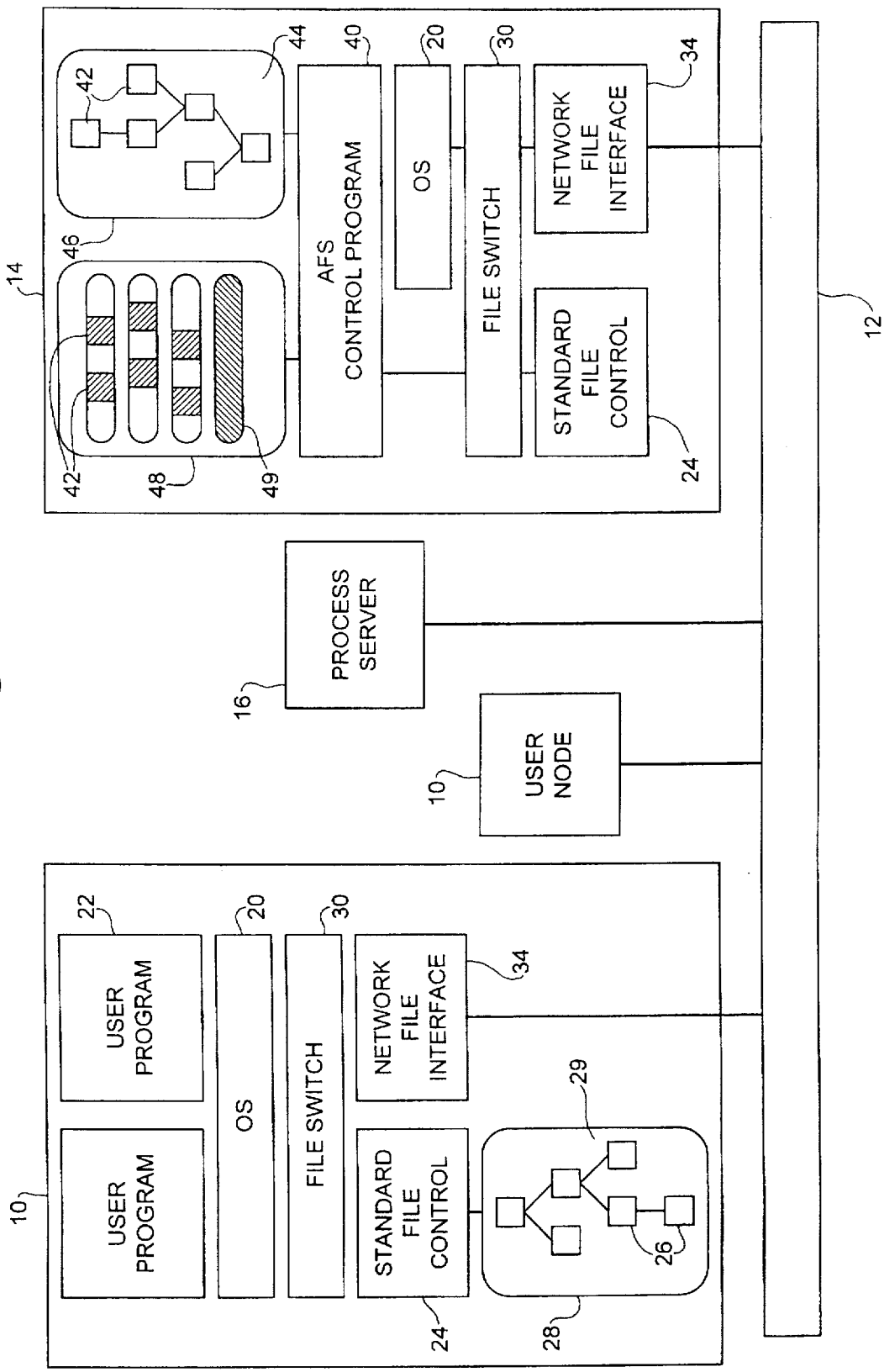
FIG. 2 is a block diagram of the archiving file system of the present invention for a network data server.

Referring now to FIG. 2, a block diagram of the archiving file system of the present invention for a network data server is shown. The user nodes 10 are organized identical to the prior art; however, the data server 14 is provided with an archiving file system (afs) control program 40 in addition to the standard file control program 24. The operating system program 20 in the data server 14 of the present invention preferably uses the same type of file switch mechanism 30 as used in the user node 10 to switch incoming requests for remote files 42 stored on a remote file tree 44 to use the remote file interface 40, rather than the standard file system program 24. This allows the archiving file system of the present invention to operate completely transparent to the user program 22. Because the afs control program 40 is programmed to handle any file requests normally made within the operating system program 20, there is no need to modify the standard file system program 24 stored at a user node 10 on the network 12. This allows for the straightforward and simple installation of a data server 14 executing the archiving file system of the present invention onto a given network 12 without the need to modify or update any of the user nodes 10 on that network 12.

In the preferred embodiment, the archiving file system of the present invention is capable of supporting a number of different types of secondary storage media. These different types of media devices can be online storage devices 46, such as magnetic disk drives, or can be removable storage devices 48, such as optical disk or magnetic tape. Unlike most prior art file systems, the archiving file system of the present invention allows remote files 42 stored on removable storage devices 418 to be considered as part of the remote file tree 44. The archiving file system of the present invention also can access removable media 49 in the removable storage devices 48 either indirectly as archival storage, or directly as secondary storage, through the use of a control structure known as a resource file. The ability to access removable media directly as secondary storage eliminates the need to stage a remote file 42 stored on a removable media 49 to an online storage device 46 before that remote file 42 can be accessed by a user program 22.

The preferred embodiment of the archiving file system of the present invention is a System V based file system that presents a standard Unix® System V, Release 4.0, file system interface to the user nodes 10 running the standard System V operating system program 20. The description of the preferred embodiment set forth below will describe the hardware and software environment of the preferred data server 14, the organization of the preferred file structure, including the control structure, utilized by the archiving file system, and, finally, the various details of the afs control program 40.

Network Data Server

Figure 3:
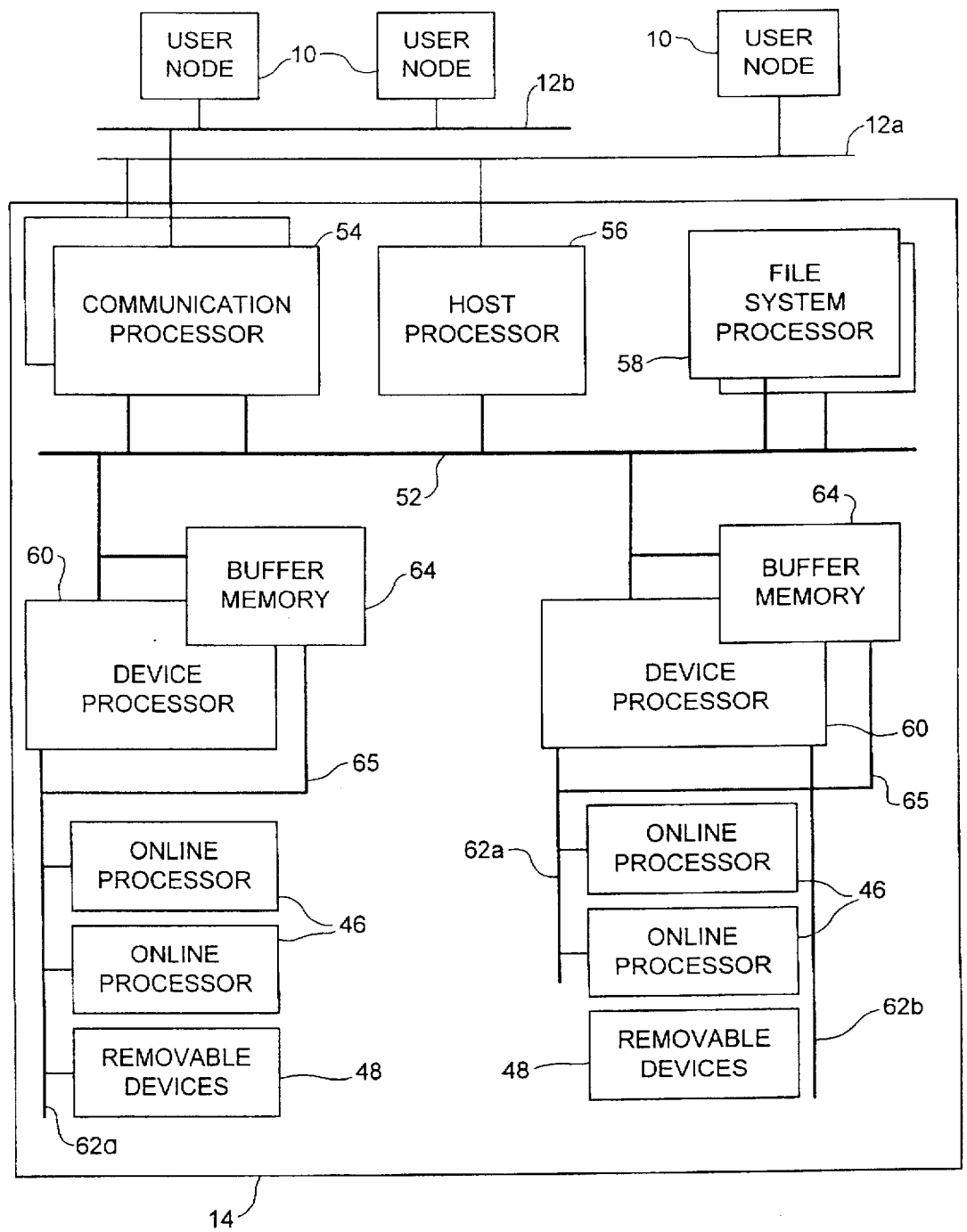
FIG. 3 is a block diagram of the preferred embodiment of a network data server in which the present invention operates.

Referring now to FIG. 3, a block diagram of the preferred embodiment of a network data server 14 is shown. Although the archiving file system of the present invention will be described in operation on the preferred embodiment of the network data server 14 shown in FIG. 1, it will be understood that the archiving file system of the present invention is equally applicable to other types of data servers, such as the data server shown, for example, in U.S. Pat. No. 5,163,131 to Row et al. For a more detailed description of the hardware operation of the preferred embodiment of the network data server 14, reference is made to the previously identified co-pending application entitled "METHOD AND APPARATUS FOR PIPELINED DATA SERVER HAVING IMPROVED DATA TRANSFER".

In the preferred embodiment, the network data server 14 is implemented using a number of microprocessor boards operating in a pipelined, multiprocessing environment and all connected to a common backplane VME bus 52 for inter-processor communication within the data server 14. In this configuration, one or more communication processors 54 or an EtherNet® port of a host processor 56 are used to interface the network data server 14 with the distributed computer networks, such as EtherNet® 12a, FDDI 12b, or Fiber Channel or any other type of Transport Control Protocol/Internet Protocol (TCP/IP) network. The host processor 56 executes standard Unix® System V, Release 4.0 operating system code to allow the data server 14 to present the standard Unix® interface to the networks 12 to which the data server 14 is connected. One or more real-time file system processors 58 execute the afs control program 40 of the present invention as described in more detail below. One or more device processors 60 are also connected to the VME bus 52 to physically control the I/O operations of the plurality of remote secondary storage devices 46, 48 that are connected to the particular device processor 60 in the data server 14 by one or more SCSI busses 62a, 62b.

In the preferred embodiment, each of the file system processors 58 is assigned one or more unique device processors 60 to control, and no device processor 60 is assigned to more than one file system processor 58 in order to minimize synchronization and contention problems within the data server 14. Each of the device processors 60 contains a buffer memory 64 connected by direct DMA access 65 to the ports for the SCSI busses 62a and 62b. The buffer memory 64 is also connected to the VME bus 52 to form part of a VME global data buffer memory space accessible by all of the processor boards 54, 56, 58 and 60. In the preferred embodiment, each buffer memory 64 has a unique 16 Mbytes of VME memory space, and the data server 14 may be populated with a total of fourteen device processors 60, each having a buffer memory 64 with 16 Mbytes of memory space for a total VME global memory space of 224 Mbytes for the data server 14. The buffer memory 64 in each device processor 60 is managed by the data server 14 of the present invention so as to implement a direct DMA transfer between the buffer memory 64 and the communication processor 54. This eliminates the need for duplicate transfers of information within the data server 14 when responding to a transfer request, thereby significantly increasing the overall transfer speed of the data server 14.

The pipelined, multiprocessing environment is preferred for the data server 14 so as to distribute the work load of responding to user nodes 10 on the networks 12 that initiate requests for remote files 42. When a request for a remote file 42 has been received over a network 12 by a communication processor 54, it is partially cracked or decoded. Cracking refers to the decoding of the commands that make up the request for the remote file 42 so that the specified operation and file name are known to the data server 14. The partially cracked command is then passed onto the host processor 56 where the cracking or decoding is largely completed. Once a remote file command has been completely cracked by the host processor 56, the host processor 56 passes that command over the VME bus 52 to the afs control program 40 executing in the file processor 58 that has been assigned responsibility for the remote file tree 44 on which the requested remote file 42 is stored.

Network File Interface

In the preferred embodiment, the requests for remote files 42 are transferred across the network 12 through the network file interface 34 as remote file commands. Examples of network file interfaces 34 for a distributed computer network environment using the System V operating system include: Network File System (NFS) and Remote File System (RFS) that are each complete record-based network file interfaces and the File Transfer Protocol (FTP) which is a simple file-based network file transfer protocol. In the case of NFS or RFS, a remote file command might be to get or put a record. In the case of FTP, a remote file command would be to read or write a whole file. For a general background on network file interfaces and remote file commands in networked computer processing systems, reference is again made to Kochan, S., Unix® Networking, Chpts. 4 and 7 (1989) Hayden Books, pp. 93–132 and 203–235. Although the preferred embodiment of the data server 14 utilizes a standard network file interface 34, it will be understood that the archiving file system of the present invention could be utilized equally as well with any number of enhanced network file interfaces.

File Switch Mechanism

As shown in FIGS. 2 and 3, the preferred embodiment of the present invention takes advantage of the resident file switch mechanism 30 within the System V operating system program 20 to allow the host processor 56 to route a remote file command to the afs control program 40 executing in the file processor 58, rather than routing the remote file command to the standard file interface program 24. In the preferred embodiment, the file switch mechanism 30 is the Vnodes file switch layer developed by Sun Microsystems. For a more detailed description of the operation and functionality of the Vnodes file switch layer, reference is made to Kleiman, S., "Vnodes: An Architecture for Multiple File System Types in Sun UNIX", Conference Proceedings, USENIX 1986 Summer Technical Conference and Exhibition, pp. 238–246; and Sandberg, R. et al, "Design and Implementation of the Sun Network File System", Conference Proceedings USENIX 1985, pp. 119–130.

Although the preferred embodiment utilizes the resident file switch mechanism 30 of the particular native operating system program 20 for the data server 14, it will be understood that the file switch mechanism 30 may be added to the native operating system program 20 executing in the host processor 56 to allow the operating system program 20 to select between the standard file control program 24 and the afs control program 40 as a secondary file system. Alternatively, the standard file control program 24 of the native operating system program 20 can simply be replaced by the afs control program 40, in which case there may be no need for the file switch mechanism 30 within the operating system program 20, although certain functions of the standard file control program 24, such as initial program load and system paging, would need to be replicated in the afs control program 40.

Prior Art File Structure

Figure 4:
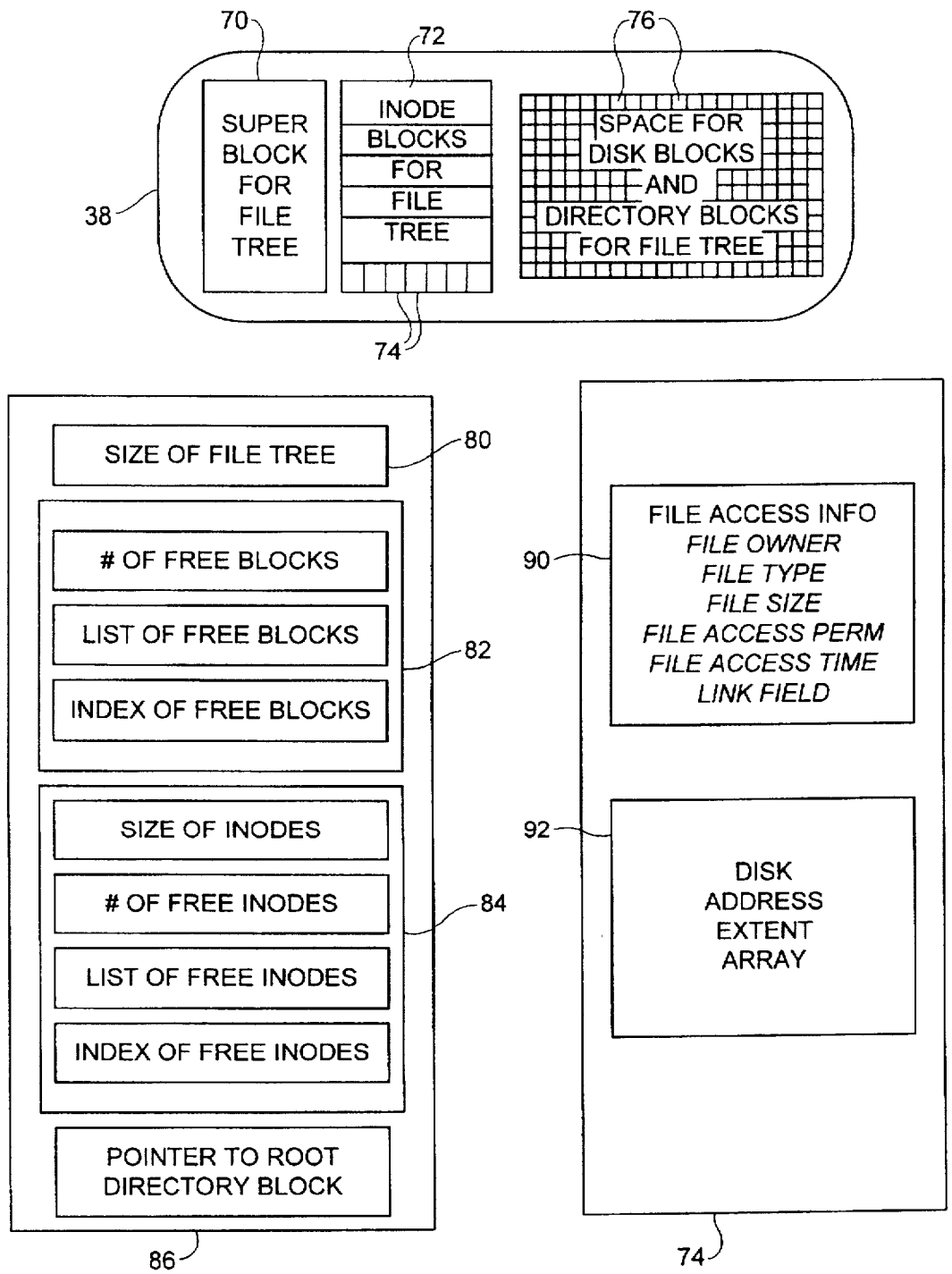
FIG. 4 is a block diagram of the prior art System V standard file structure.

Referring now to FIG. 4, a block diagram of the prior art file structure for a System V based standard file system is shown. The description set forth below provides an overall understanding of the System V standard file system for purposes of distinguishing this file system from the archiving file system of the present invention. For a detailed explanation of the structure and operation of the entire System V based standard file system, reference is again made to Bach, M., *The Design of the Unix® Operating System Program*, Chpt. 4 (1986), Prentice Hall, pgs. 60–90; and Leffler, McKusich, Karels and Quarterman, *The Design and Implementation of the 4.3 BSD Unix® Operating System*, (1990), Chpt. 7, pp. 187–223.

In the System V standard file system, each file tree 38 is allocated a predefined amount of space on one of the remote secondary storage devices 36. As previously mentioned, in the prior art System V standard file system, all of the storage space assigned to a given file tree 38 must be located on the same physical secondary storage device 36; however, more than one file tree 38 can be defined on a single physical secondary storage device 36. A super block 70 having a predefined size stores certain control information at the beginning of the space assigned for each file tree 38. Following the super block 70, a predetermined number of logical control blocks 72 are allocated to store index nodes or inodes 74 for each of the files 32 that are contained within the file tree 38. In the preferred embodiment, there are sixteen inodes 74 stored for each logical control block 72. The remaining space assigned to the file tree 38 is for data blocks 76 that will be assigned by the file control program 24 to files and directories in that file tree 38 using the control structures stored in both the super block 70 and the inodes 74.

The super block 70 contains certain control information that is used by the control program to manage the files and directories stored in the file tree 38. This control information includes a file tree size field 80, free block information 82, inode information 84 and a root directory pointer 86 that points to an inode 74 that containing the logical address of the directory blocks that store the files and directories in the root directory for the file tree 38. In the System V standard file system, the file control program 24 maintains a list of free blocks and an index of free blocks as part of the free block information 82 and then uses this information to assign the unused data blocks 76 in response to a request to store a new file or increase the size of an existing file. The file control program 24 also maintains a similar list of free inodes and index of free inodes as part of the inode information 84 that is used to manage the assignment of inodes 74 within the control blocks 72.

Each inode 74 contains certain file access information 90 necessary for the file control program 24 to access a file. In addition to the file access information 90, each inode also contains a disk address extent array 92 that acts as a table of contents for the file by storing the addresses of the logical disk blocks 76 which are assigned to this file. The file access information 90 includes:

| | |
|---|---|
| file owner | Identifies an individual owner and a group owner who are always allowed to access the file. |
| file type | Defines whether the file is a regular file, a directory, or a special file. |
| file size | Defines the size of the file in bytes. |
| file access perm | Defines the read/write/execute permission for the owner, group owner, and all other users in the system. |
| file access time | Identifies the last time the file was modified, the last time the file was accessed, and the last time the inode 70 for the file was modified. |
| link field | Stores the number of names the file has in the directory. |

The file control program 24 uses the block information 82 to assign logical disk blocks 76 to a file and then modifies the disk address extent array 92 in the inode 74 for that file to indicate which logical disk blocks 76 have been assigned to that file. The file control program 24 also uses and maintains the other fields of the access information 90 in the inode 74 to manage access to that file.

Archiving File System File Structure

Figure 5:
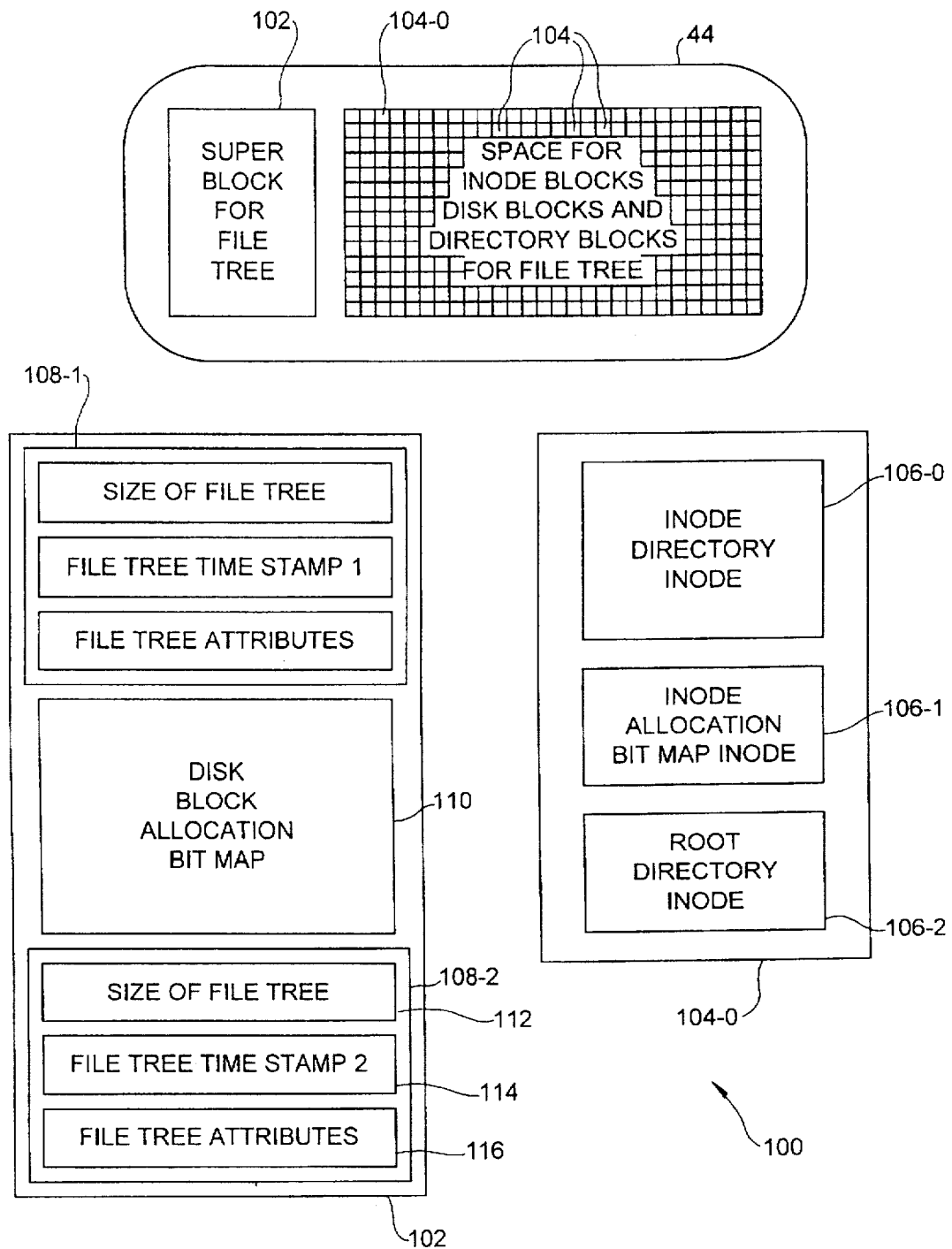
FIG. 5 is a block diagram of the file structure of the archiving file system of the present invention.

Referring now to FIG. 5, a block diagram of the archiving file system (afs) file control structure 100 of the preferred embodiment of the present invention is shown. In contrast to the prior art file structure shown in FIG. 4 which preallocates a certain amount of storage for the super block 72 and a predefined number of the control blocks 72, the afs file control structure 100 only preallocates storage for a single file tree super block 102 for each file tree 44. All of the remaining space assigned to the file tree 44 is for disk blocks 104 that will be assigned by the afs control program 40 as data blocks for files and directories in that file tree 44, as well as dynamically allocated control blocks for inodes 106. Unlike the prior art inodes 76 which are stored in preallocated space in the file tree 39, the afs file control structure 100 stores the inode control information for each remote file 42 as an addressable file, inode 106, having space on the secondary storage system 46, 48 that is dynamically allocated in the same manner in which space is allocated for any other remote file or directory in that file tree 44.

The super block 102 is also unlike the super block 70 of the prior art file system. The super block 102 contains two file tree control blocks 108-1 and 108-2, and a disk block allocation bit map 110. The afs control program 40 uses the disk block allocation bit map 110 to assign unused disk blocks 104. For example, the afs control program 40 might assign a particular disk block 104 as a data block in response to a request to store a new file or increase the size of an existing file, or the afs control program 40 might assign a particular disk block 104 as a control block in response to a request to open a new file. Unlike the prior art file control program 24 which uses a list and index of free blocks to keep track of disk blocks 76, the afs control program 40 uses the disk block allocation bit map 110 as a bit-indicator of whether the disk block 104 is assigned or available, with one bit in the disk block allocation bit map uniquely representing every disk block 104 assigned to that particular file tree 44. The afs control program 40 maintains a working copy of the disk block allocation bit map 110 in the private memory of the file system processor 58 and scans the bit map 110 for available disk blocks 104 in a forward round-robin manner in response to a request to allocate space in the file tree 44.

The preferred embodiment of the afs control structure 100 maintains two separate file tree control blocks 108-1 and 108-2 as part of the super block 102. Each file tree control block 108 contains a file tree size field 112, a file tree time stamp field 114, and a field 116 for other file tree attributes. A program listing of the data fields for the super block 102 of the preferred embodiment is included as Appendix A-1. The afs control program 40 alternates updating the file tree control blocks 108-1 and 108-2 as part of an automatic backup procedure that enables the file system to ensure the proper recovery of all valid file transactions in the event of a fault or hardware failure on the data server 14, e.g., an unexpected loss of power. Briefly, the afs control program 40 alternates updates of the file tree control information between a primary and a secondary online device 46 that store the file tree 44. In a recovery situation, the afs control program 40 will examine the file time stamp field 114 in both of the file tree control blocks 108-1 and 108-2 on both the primary and secondary online device 46 to determine which file tree control block accurately contains information on the latest valid transaction which have occurred for that file tree 44. For a more detailed explanation of the use of the file tree control blocks 108-1 and 108-2 as part of an automatic backup and recovery procedure, reference is made to the previously identified co-pending application entitled "METHOD AND APPARATUS FOR FILE RECOVERY FOR SECONDARY STORAGE SYSTEMS".

In the archiving file system of the present invention, the amount of space needed to store the inodes 106 for a file tree 44 is allocated on an as-needed basis. The result is that if a large number of very small remote files 42 are store on a particular file tree 44, then more space will be allocated to stored the inodes 106 for those files. In contrast, if a small number of very large remote files are stored on a particular file tree, then very little space will need to be allocated to store the inodes 106 for those files. In this way, the afs file control structure 100 avoids the problems of the prior art file systems that have a fixed amount of space in the form of a predefined number of control blocks 72 reserved for storing inodes 76. In the prior art file systems, if there are not enough control blocks 72 preassigned for storing inodes 76, then empty space in the file tree 39 cannot be used when there is no more room to allocate additional inodes 76; or, if there are too many control blocks 72 preassigned for storing inodes 76, then space is wasted by the control blocks 72 that are unused when all of the disk blocks 74 have been allocated to a few large number of remote files 32.

Figure 6:
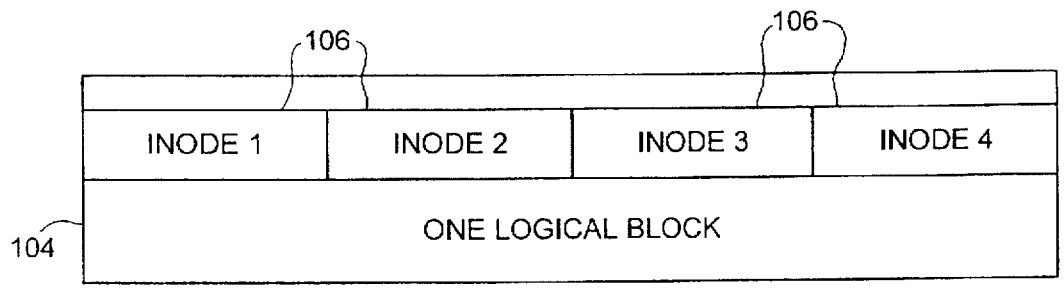
FIG. 6 is a block diagram of the arrangement of index nodes and disk address extent array for the preferred embodiment of the file structure shown in FIG. 5.
Figure 6:
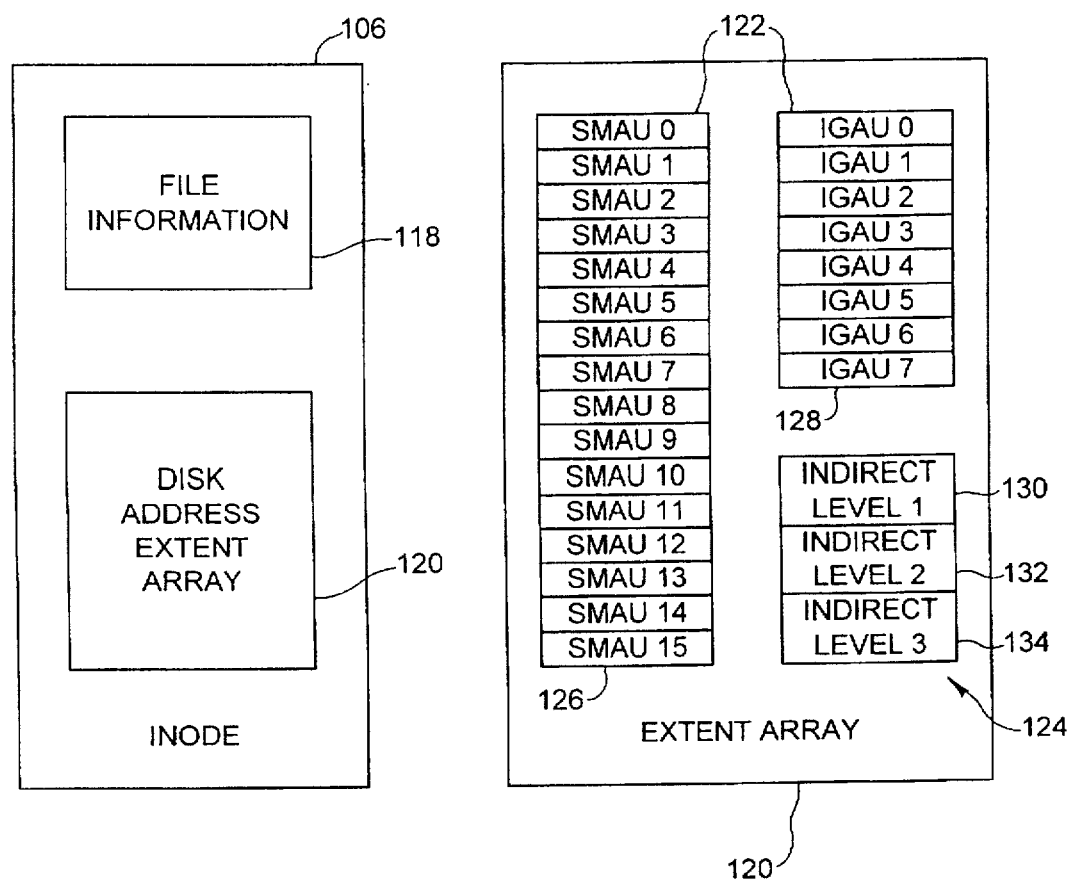

In the preferred embodiment of the afs control structure 100, the very first disk block 104-0 assigned to a file tree 44 is defined to contain at least three inodes 106, the inode directory inode 106-0, the inode allocation bit map inode 106-1, and the root directory inode 106-2 for the file tree 44. FIG. 6 shows the arrangement of an inode 106 in accordance with the preferred embodiment of the present invention. In this embodiment, each inode 106 occupies 256 bytes and there are four inodes which are stored in a logical disk block 104 of a size of 1K bytes. Each inode 106 contains file access information 118 and a disk address extent array 120. In addition to the normal file access information 90 found in the prior art, the file access information 118 of the present invention contains a hierarchically selectable set of archival attributes 140 and one or more archive block pointers 143 to archive blocks 144 (FIG. 7) that are used by the afs file system to perform archiving of the remote files in an intelligent and efficient manner that is selectable by the individual user. The disk address extent array 120 contains block number pointers corresponding to the logical disk blocks 104 which have been allocated for the particular file represented by this inode 106. An additional step of transforming the logical block number pointers to one or more actual physical addresses in the form of cylinder and sector number on a disk drive, for example, is typically performed by the device controller 60.

As described in further detail in connection with the description of the buffer management module, two versions of the inode 106 are actually supported by the afs file structure 100, a device version of the inode 106 that is resident on the secondary storage device 46, 48 and a buffer version of the inode 106 that is resident in the buffer memory 64 of the data server 14. A program listing of the data field for the preferred embodiment of the device version of the inode 106 is included as Appendix A-2, and a program listing of the data fields for the preferred embodiment of the buffer version of the inode 106 is included as Appendix A-3.

In the preferred embodiment, as shown in FIG. 6, the logical block number pointers for the disk blocks 104 include data addresses for direct allocation units 122 and for indirect level pointers 124. The direct allocation units 122 include a plurality of small allocation units (smau) 126 and a plurality of large allocation units (lgau) 128. In the preferred embodiment, each small allocation unit 126 is a logical disk block 104 of 1K byte in size and each large allocation unit 128 is a logical disk block of 16K bytes in size. The information contained in the extent array 120 is stored in the inode 106 as byte addresses that are right shifted 10 bits (1024) whereby the byte addresses delineate units of 1024 bytes or, in this case, the small allocation unit 126. Information for any particular logic disk block 104 is stored as four bytes of byte address and one byte that defines the logical disk ordinal for implementing the storage family disk set feature described below. In this embodiment, the inode 106 contains direct allocation units 122 for sixteen small allocation units 126 and eight large allocation units 128, and the indirect level pointers 124 include a plurality of first indirect level pointers 130, second indirect level pointers 132 and third indirect level pointers 134. In the preferred embodiment, each indirect level pointer 124 is a large allocation unit 128. Each first indirect level pointer 130 stores the data address of another large allocation unit disk block 104 that contains the direct allocation units 122 for the first indirect level. Each second indirect level pointer 132 stores the data address of a set of first indirect level pointers 130. Each third indirect level pointer 134 includes the data address of a set of second indirect level pointers 132. For a more detailed description of the operation of the dual size logical storage allocation units, reference is made to the previously identified co-pending application entitled "METHOD AND APPARATUS FOR STORAGE ALLOCATION FOR SECONDARY STORAGE SYSTEMS".

Control of Archival Process

Figure 7:
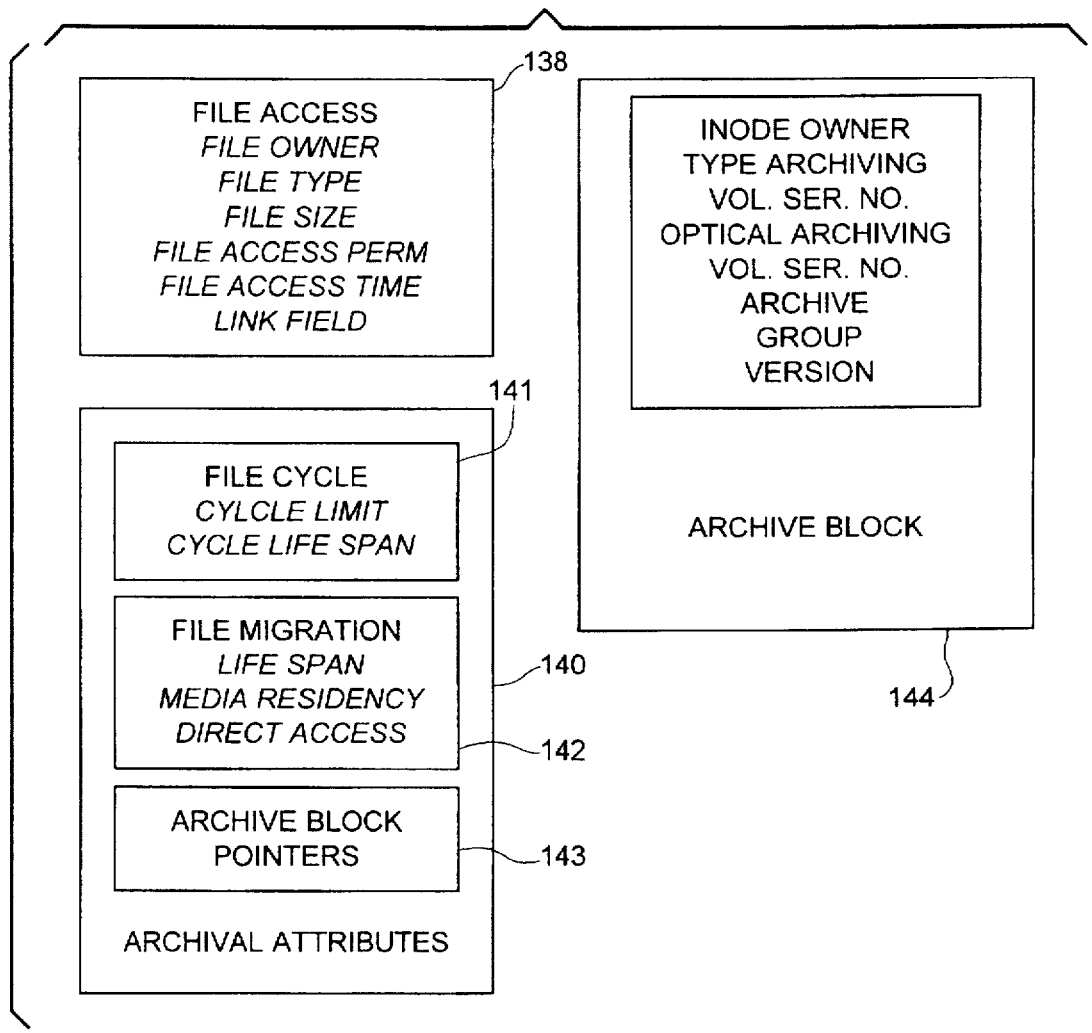
FIG. 7 is a block diagram of the file information in each index node of the preferred embodiment of the file structure shown in FIG. 6.
Figure 8:
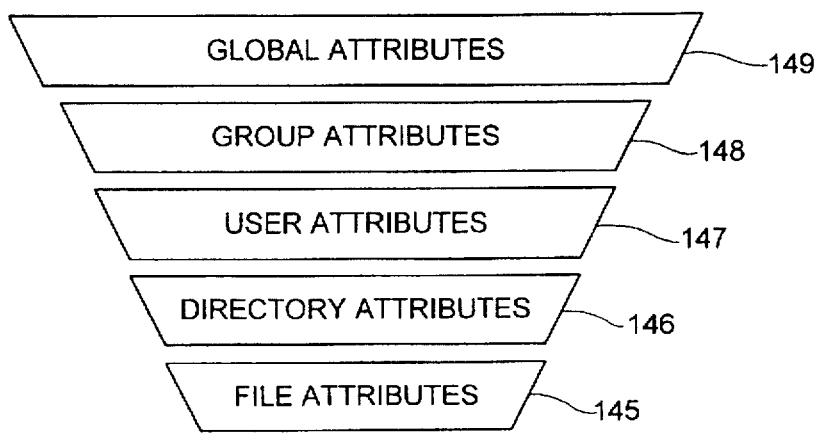
FIG. 8 is a schematic diagram of the hierarchy used to select the archival file attributes shown in FIG. 7 that control the archiving of a remote file.

Referring now to FIGS. 7 and 8, the hierarchically selectable archival file attributes and the archive block pointer of the present invention will be described. FIG. 7 shows the preferred embodiment of the file access information 118 that is defined for each remote file 42. In addition to the standard file access information 138, the afs control structure 100 provides for a hierarchically selectable set of archival file attributes 140 and one or more archive block pointers 143 that point to up to four archive blocks 144 that are associated with each remote file 42. The afs control program 40 uses a unique hierarchy and resolution order for determining the unique set of archival file attributes 140 that will be selected to control the archiving of each remote file 42. The archival file attributes 140 determine how many copies of a remote file 42 will exist within the data server 14, how long a remote file 42 is to be maintained and on what media the remote file 42 is to reside. A program listing of the data fields for the preferred embodiment of the archival file attributes 140 and the archival blocks 144 is included as Appendix A-4.

As part of the archival process, the afs control program 40 uses a cycles attribute 141 to determine whether to create cycles of previous versions of a file. When a new version of a file is created the previous version will be saved as a cycle if cycles 141 are enabled for that file. The user may specify the number of cycles to be maintained and their life span by setting the following attributes:

| | |
|---|---|
| Cycle Limit | Specifies the maximum number of cycles that can exist for the file. Once the limit has been reached the oldest existing cycle will be released each time a new cycle is created. |
| Cycle Life Span | Specifies the life span or time to live criteria for the cycles of a file. Once the life span has been exceeded, the cycle is eligible for termination. The life span of cycles cannot be greater than the life span of the file itself. In the preferred embodiment, Cycle Limit and Cycle Life Span may be set only at the File level of the hierarchy. |

A second part of the archival process is the automatic migration of remote files 42 from on-line storage 46 to archival media 48 for backup and data security purposes. Migration may occur automatically at site-defined time intervals or by direct operator intervention in accordance with the file migration attribute 142. Up to four copies of archival media may be specified for each remote file 42. Whether a remote file 42 will be archived, how many archive copies will exist, on what type of removable media 49 the archive copies will reside, how the archive copies will be accessed and how long the archive copies will last is determined by the following parameters in the file migration attribute 142:

| | |
|---|---|
| Life Span | Specifies a life span for the remote file. The life span may be specified in days, weeks, months or years. Once the life span has been exceeded, the remote file is eligible for termination. Termination will not normally occur unless media space is needed. |
| Media Residency | Specifies which media types and formats are acceptable for storing or archiving the file. The specification can be either general (i.e. tape) or specific (i.e. 3480 tape). The residency requirements may be specified for on-line storage and up to four levels of archival storage. These criteria allow for the control of risk and cost associated with storage of the file. |
| Direct Access | Specifies whether the contents of a file resident on optical disk can be directly accessed from the archive medium without first being staged onto on-line storage 46. Direct access from tape is not allowed. |

The final part of the archival process to be controlled by the file information 118 is the archival block 144 which assigns a set of parameters that identify, define ownership, define access control and specify the location of that unit of the archival media for that remote file 42. These parameters for the archival block 144 include:

| | |
|---|---|
| Media Type | Identifies the type of media. Archival media is some form of tape, optical disk, or other permanent and transportable removable media. For example, tape would be identified as either 3480 or VHS. |
| Volume Serial Name | A machine readable name assigned to the media. This combined with the media type uniquely identifies the storage entity. |
| Location | Identifies the physical location of the given storage entity. This information may be used by automated mounting systems such as a jukebox, |

-continued

| | |
|---|---|
| | or for manual operations such as room and rack location. |
| Access | Identifies whether the access mode for the media is read, write or read/write. |

For optical removable media, the following additional attributes are included:

| | |
|---|---|
| File_ID | Identifies the file identifier recorded on the optical media. |
| Owner_ID | Identifies the owner of the optical media. |
| Group_ID | Identifies the group of the optical media. |
| Version | Identifies the version of the optical media. |

For magnetic tape removable media, one additional attribute is included:

| | |
|---|---|
| No Rewind | Indicates the rewind status of the magnetic tape removable media. |

FIG. 8 shows the various hierarchy levels that are used by the afs control program 40 for determining the archival file attributes 140 that will be used to control storage and archiving of a particular remote file 42. In the preferred embodiment, the various levels are File Level 145, Directory Level 146, User Level 147, Group Level 148 and Global Level 149. The archival file attributes 140 either can be directly defined for an individual remote file 42, or can be defaulted in accordance with the hierarchy. At each level of the hierarchy, the scope of the level encompasses a larger group of remote files as the priority level increases. Direct association of an attribute level at given Level 147 can be made only to a level of greater priority, i.e., attributes at the User Level 147 can only be directly associated to the Group Level 148 and the Global Level 149. The File Level 145 and Directory Level 146 attributes may be set by the user. The User Level 147, Group Level 148 and Global Level 149 attributes are maintained by a system administrator. In the preferred embodiment, the User Level 147 and Group Level 148 attributes are maintained as separate files in the file tree 44 and are accessed by the afs control program 40 if a mode attribute field in the file access information 118 indicates that the User Level 147 or Group Level 148 attributes are to be used for a particular remote file 42. The Global Level 149 attributes are maintained as data values specified by the system administrator within the private memory of the afs control program 40.

Archiving File System File Control Program

Figure 9:
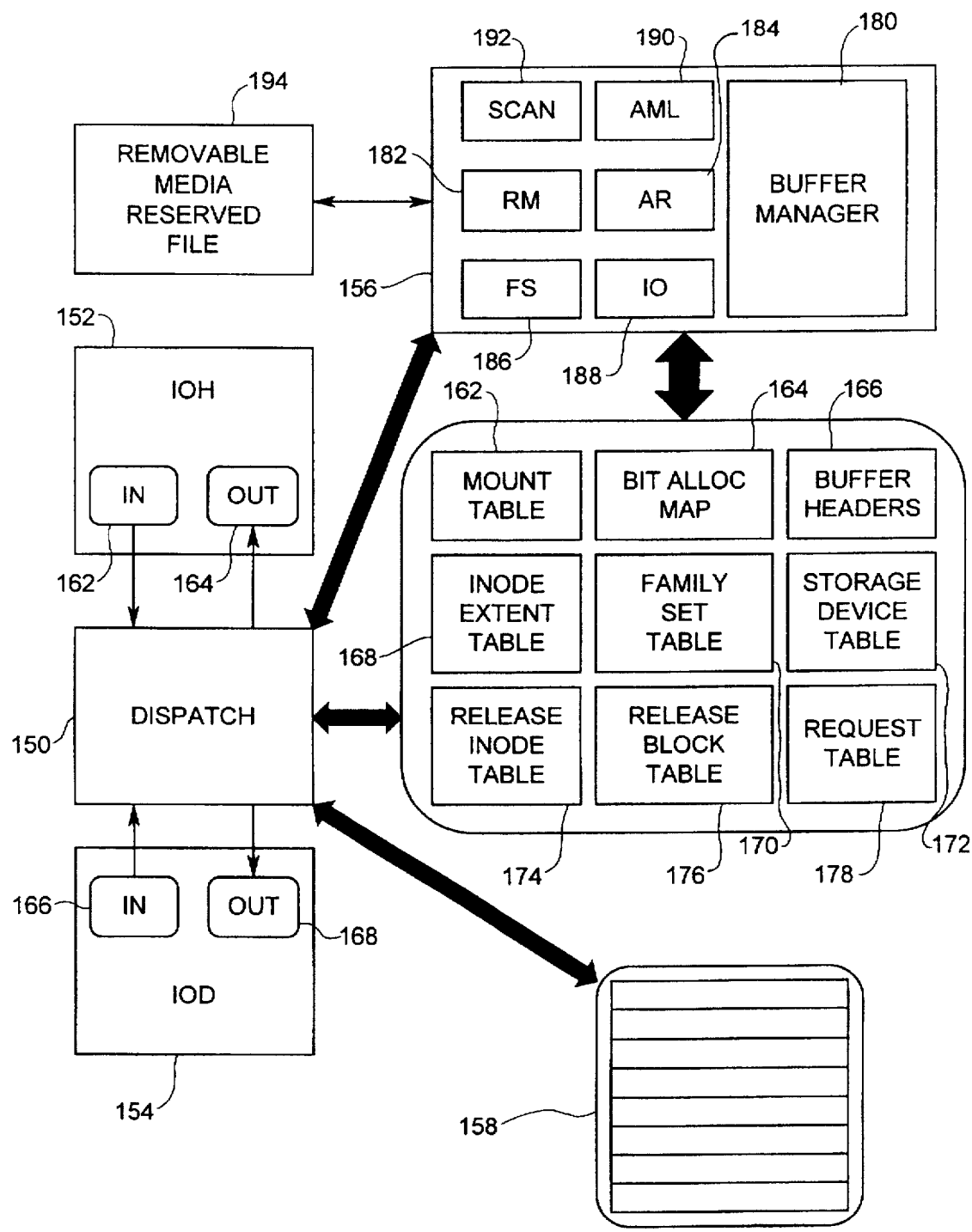
FIG. 9 is a schematic block diagram of the program modules and data structures that comprise the file control program of the archiving file system of the present invention.

Referring now to FIG. 9, the overall relationship between the principal control modules Dispatch 150, IOH 152, IOD 154 and the program modules 156 with the primary data structures command packets 158 and table structures 160 for the archiving file system (afs) control program 40 will be described. The preferred embodiment of the afs control program 40 executes in the file system processors 58 and communicates with the host processor 56 via the IOH (input/output host) module 152 and with the device processors 60 via the IOD (input/output device) module 154. Both the IOH module 152 and IOD module 154 have a pair of in and out buffers 162 and 164, and 166 and 168 in which remote file commands that were received from or transmitted to the VME bus 52 are stored. As will be appreciated by a programmer skilled in the art, the IOH module 152 and IOD module 154 have appropriate pointers and flags for managing the buffers 162, 164, 166 and 168, and for communicating the commands with the Dispatch module 150.

The Dispatch module 150 executes remote file commands received from the host processor 56 via the IOH module 152 by using a table lookup procedure to access the command packets 158 which define the device level operations required to complete a particular remote file command. A program listing of a sample set of command packets for the preferred embodiment is included as Appendix A-5. Based on the command packet 158 being executed, the Dispatch module 150 calls the program modules 156 to execute the command packet 158, and, if required, build a device level command packet which is sent to the device controller 60 via the IOD module 156. The function of each of the program modules 156 is described in detail below.

In the preferred embodiment of the afs control program 40, the table structures 160 are stored in the private memory of the file control processor 58 and are not part of the global VME data space. The mount table 162 contains a table of certain control information relating to each file tree 44 in the network data server 14 that is mounted by any user node 10 on the network 12. A program listing of the data fields for the preferred embodiment of the mount table 162 is included as Appendix A-6. The Bit Alloc Map 164 stores the in core copy of the disk block allocation bit map 110. The Buffer Headers 166 contain a table of certain control information relating to each cache buffer that is defined in the buffer memories 64. A program listing of the data fields for the preferred embodiment of the buffer headers 166 is included as Appendix A-7. The inode Extent Table 168 contains the in core copy of those disk address extent arrays 120 which are currently being utilized by the FS module 154. The Family Set Table 170 contains a table of certain control information to support the definitions of storage family sets as that feature is described below. The Storage Device Table 172 contains a table of certain control information that define the operational characteristics of the particular secondary storage devices 46, 48 attached to the network data server 14. A program listing of the data fields for the preferred embodiment of the Storage Device Table 172 is included as Appendix A-8. A Release inode Table 174 and Release Block Table 176 contain listings of any inodes 106 or logical blocks 104 that have been released by the afs file control program since the last system sync point. This information is used as part of the updating of the control information from the buffer memories 64 to the secondary storage devices as described in more detail in the co-pending application entitled "METHOD AND APPARATUS FOR FILE RECOVERY FOR SECONDARY STORAGE SYSTEMS". A request table 178 contains a listing of all of the removable media 49 which have been defined by the system administrator as being available to be accessed by the afs file system. This information is used by the RM module 182 as a table of contents for searching for removable media 49. The manner in which the Dispatch module 150 and the program modules 156 utilizes the various tables in the table structures 160 is described in detail below.

The program modules 156 of the preferred embodiment of the afs control program 40 include a buffer manager module 180 that manages the pointers for the cache buffers defined in the buffer memories 64 to set up the DMA transfers across the VME bus 52 between the buffer memories 64 and the communication processors 54. The buffer manager module 180 is accessed by four program modules 156 that are called by the Dispatch module 150 to process a file command and/or automatically manages the file: the removable media manager (RM) module 182, and the archiving (AR) module 184, the file system (FS) module 186, the input/output (IO) module 188. The manner in which each of these module operates and uses the table structures 160 is described in detail below. Two other program modules 156 are run periodically by the Dispatch module 150 or respond to interrupt demands for handling the removable media 49: an automated media loader (AML) module 190 and a scanner (Scan) module 192. The manner in which each of these modules interact with a removable media resource file defined for each removable media 49 is also described in detail below.

For a more detailed description of operation of the afs control program from the perspective of the user node 10 or the system administrator, including a listing of the commands available for the afs file system that are a superset of the standard System V file system commands, reference is made to the "Operations and Reference Guide" for the *Visualization File System for the Integrated Data Station*, (February 1993), available from Large Storage Configurations, Inc., Minneapolis, Minn., a copy of which is attached to this application as an appendix and the disclosure of which is hereby incorporated by reference.

Buffer Manager module

Figure 10A:
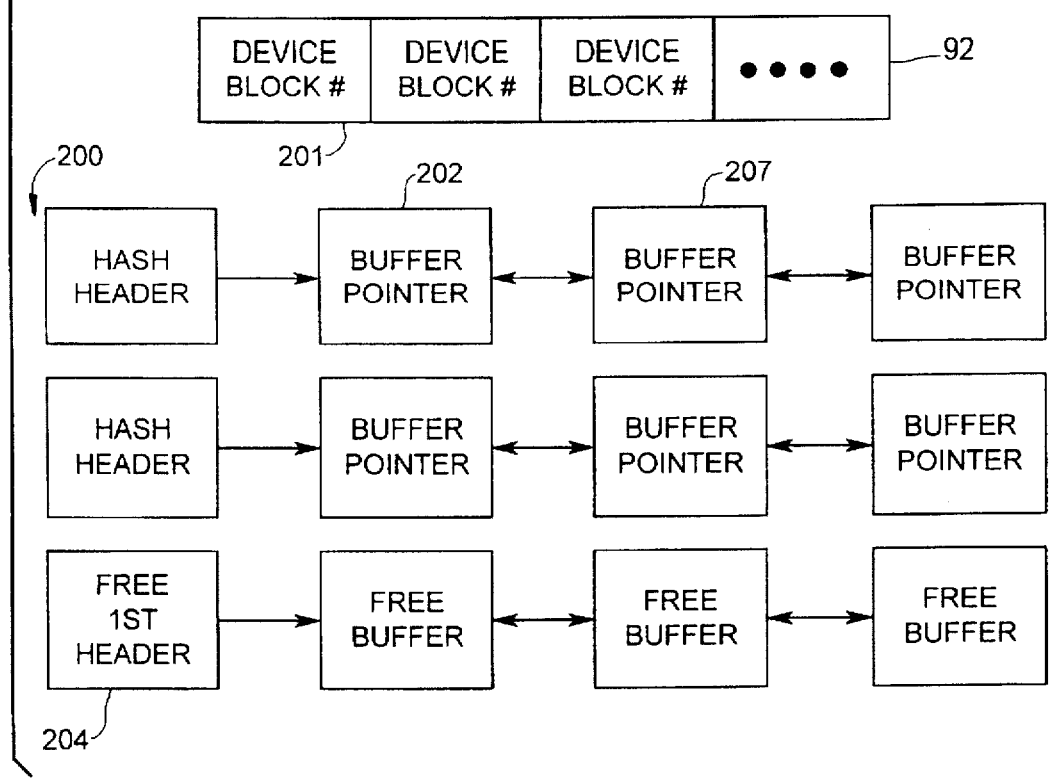
FIGS. 10a and 10b are a block diagram and a flow chart, respectively, showing the prior art method for managing cache buffers.
Figure 10B:
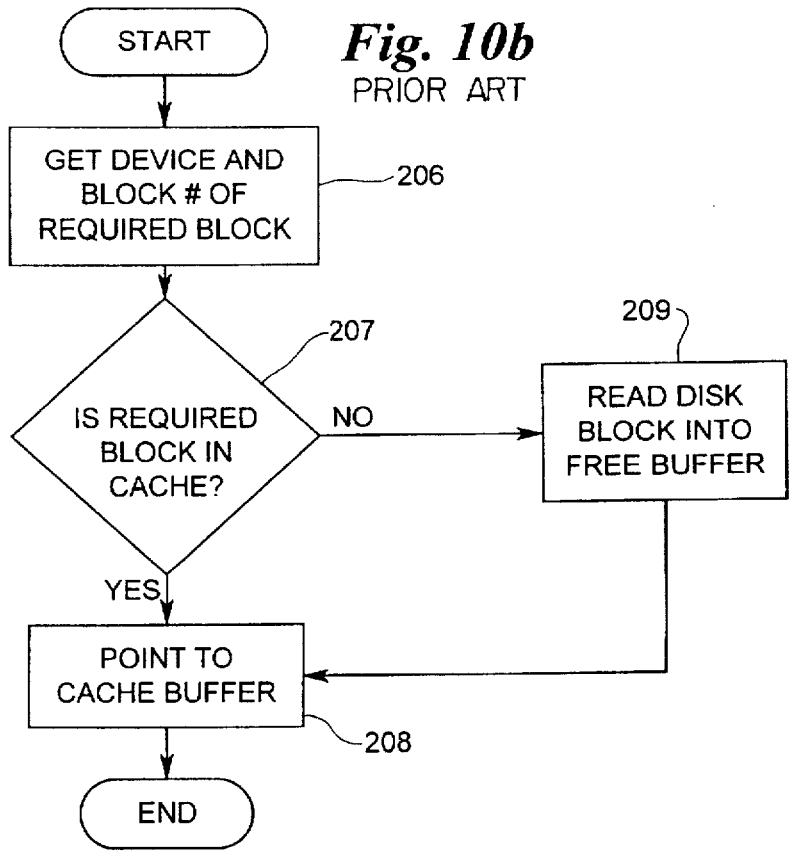

Referring now to FIGS. 10a and 10b, the manner in which the pool of cache buffers of the prior art System V-based file systems are managed will be briefly described in order to compare the prior art method of buffer management to the way in which the pool of cache buffers of the present invention are managed by the buffer manager module 180. For a more detailed description of the structure and management of cache buffers in the prior art System V-based file systems, reference is made to Bach, M., *The Design of the Unix® Operating System*, Chpt. 3, (1986), Prentice Hall, pp. 33–58.

As shown in FIG. 10a, the prior art file system uses a series of hash chains 200 that contain a double link list of the cache buffer pointers 202, in combination with a circular double link list of free list 204 of inactive cache buffers to manage the cache buffers. All of the cache buffers defined for the file system are represented by a single cache buffer pointer 202 in the hash queues and no two cache buffers may contain the information from the same disk block 76. When the prior art file system receives a request for a remote file 32, the disk address extent array 92 in the inode 74 is examined to determine the device and block number 201 of the disk block 76 that is being requested (step 206—FIG. 10b). The prior art file system then searches through the hash chains 200 using the device and block number 201 of the requested disk block 76 to determine if that disk block is resident in the pool of cache buffers (step 207). If a match is found in the hash chain search, then the information in the cache buffer pointed to by the matching cache buffer pointer 202 is used satisfy the request (step 208). If no match is found, then the requested disk block 76 is read into the next free cache buffer pointed to by the free list 204 (step 209) and that cache buffer is used to satisfy the request (step 208).

Even though the hash chains 200 in the prior art are organized and searched according to a hashing algorithm that attempts to distribute the cache buffer pointers 202 evenly so as to minimize the impact on system performance, the time spent searching the hash chains 200 obviously increases the time required to respond to a request for a disk block 76 that is cached. In addition, although the hash chains 200 are not supposed to have duplicate or incorrect cache buffer pointers, it is possible for the hash chains 200 to become corrupted and incorrectly point to the wrong locations in the cache memory from which to get the requested information for the disk block 76.

Figure 11A:
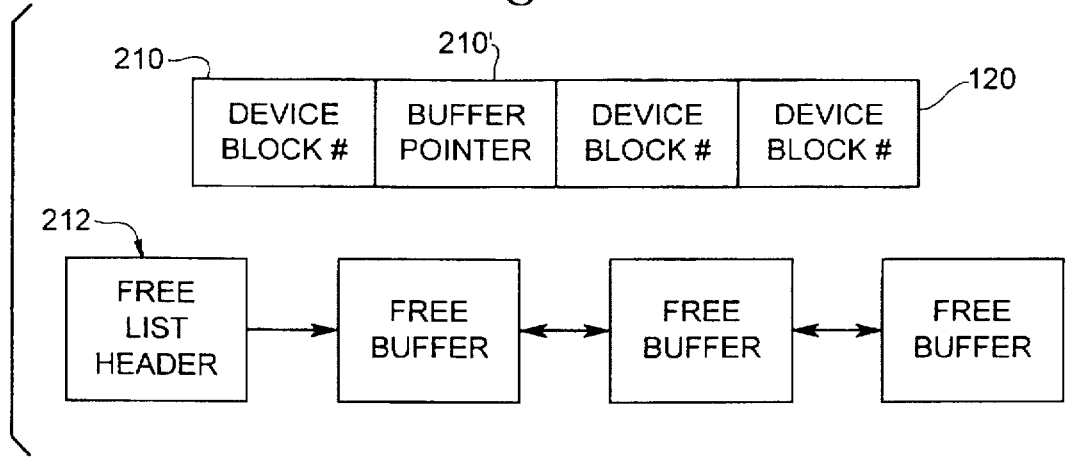
FIGS. 11a and 11b are a block diagram and a flow chart, respectively, showing how cache buffers are managed by the archiving file system of the present invention.
Figure 11B:
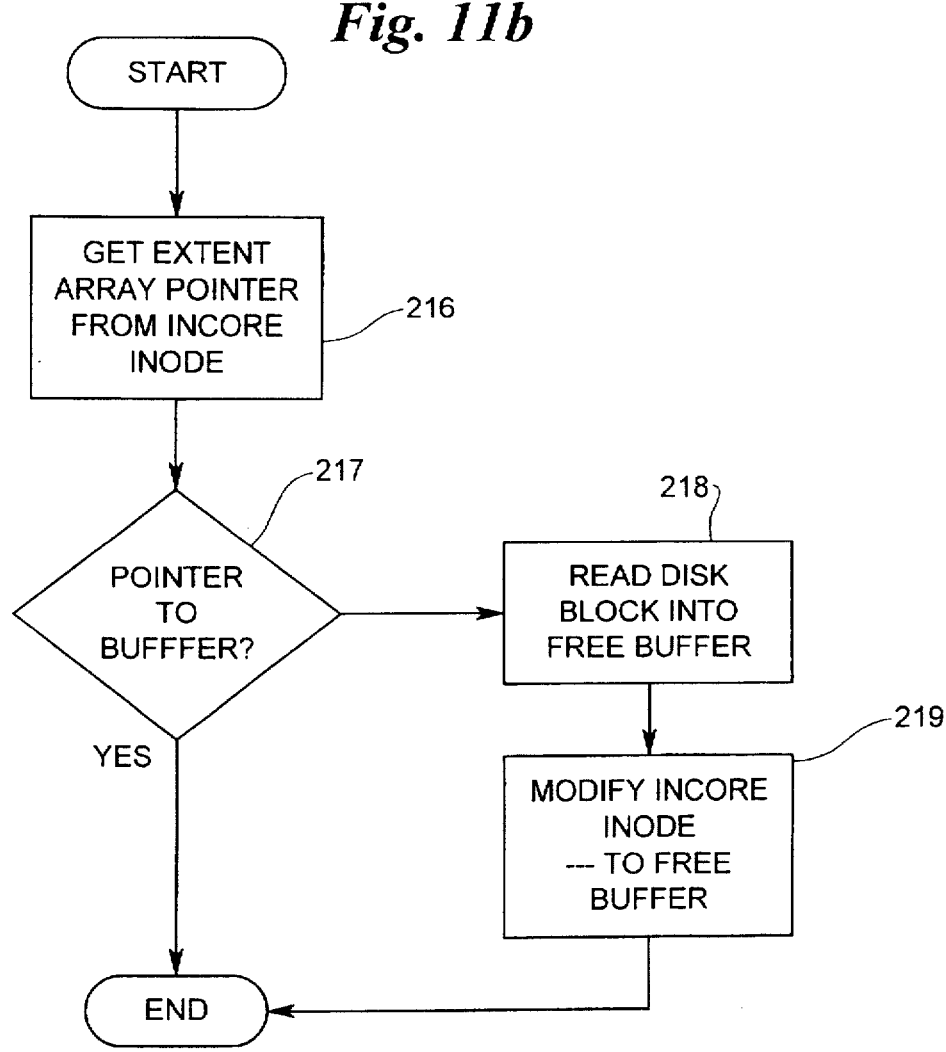

Referring now to FIGS. 11a and 11b, the manner in which the buffer manager module 180 manages the cache buffers of the present invention will be described. In contrast to the prior art method of buffer management, the afs file system of the present invention modifies a extent array pointer 210' in the disk address extent array 120 to reflect that that disk block 104 is presently stored in a cache buffer defined in the buffer memories 64. As with the prior art method, the buffer manager module 180 gets an extent address pointer 210 of the requested disk block 104 from the in core version of the inode 106 (step 216—FIG. 11*b*). If the disk block 104 pointed to by the extent array pointer 210 is presently stored in a cache buffer, then the buffer management module 180 uses the modified extent array pointer 210' stored in the in core version of the inode 106 to point directly to the cache buffer (step 217). If the disk block 104 pointed to by the extent array pointer 210 is not presently stored in a cache buffer, then the buffer management module 180 reads the disk block 104 into a free cache buffer as determined from a free list 212 of cache buffers that operates like the prior art free list 202 (step 218) and modifies the in core version of the inode 106 to point to that cache buffer (step 219), rather than the device and block number of the disk block 104 as stored on the secondary storage devices 46, 48.

Removable Media (RM) module

Referring again to FIG. 9, the RM module 182 manages all of the removable media 49 for the network data server 14 in connection with the AML module 190 and the Scan module 192. The RM module 182 may be called by the FS module 186 or the AR module 184, depending upon whether the removable media 49 is being accessed directly in the manner described below, or is being used as an archival media. The afs control program 40 provides the user programs 22 with transparent access to remote files 42 which are stored on removable storage media 49 (i.e., magnetic tape, optical disk, tape cartridges) through the use of a control structure known as a removable media resource file 194.

The removable media resource file 194 allows remote files 42 stored on removable media to be truly considered as an integral part of the file tree structure 44. The remote files 42 stored on the removable media 49 are accessed from the perspective of the user program 22 in the same manner in which the remote files 42 stored on online devices 46 are accessed. The removable media resource file 194 contains access information that identifies a specific entity of removable storage media 49. The access information can be identified for standard media formats in the appropriate ANSI standard or in non-standard formats according to appropriate vendor supplied documentation. A program listing of the data fields for the preferred embodiment of the removable media resource file 194 is included as Appendix A-9.

At the time the identified removable media and a remote file 42 stored thereon are to be accessed (e.g., open time) the RM module 182 uses the removable media resource file 194 which has been preestablished for that particular removable media 49 to provide the necessary information to facilitate mounting of the removable media 49 on a secondary storage device 48 that can access the removable media 49. The RM module 182 automatically makes the connection to the removable media resource file 194 with the particular secondary storage device 48 on which the removable media 49 is mounted by using the Scan module 192 and the AML module 190. It will be noted that for management of tape files in the System V operating system, either a symbolic link or a shell variable is used to identify to the user program 22 a connection to the particular secondary storage device 48 on which the tape file has been mounted.

In the afs control program 40 of the present invention, this connection is created only when the remote file 42 is actually opened, thereby eliminating the window between the time the tape is requested to be mounted on and the time the file is actually accessed (r/w). When access to the remote file 42 stored on the removable media 49 is terminated (e.g., close time), the RM module 182 releases the particular secondary storage device 48 on which the removable media 49 is mounted; however, in the preferred embodiment, the removable media 49 remains physically attached to the secondary storage device 48 to facilitate later access to the remote file 42, until such time as an unload command is issued by the AML module 190 to free up a secondary storage 48.

An integral task of the afs control program 40 with respect to removable media resource files 194 is the continual scanning of all removable media storage devices 48 associated with the file tree structure 44 by the Scan module 192. If a new removable media 49 has been mounted on one of the removable media storage devices 48, the Scan module 192 reads a label on the removable media and generates a removable media label record located in the Storage Device table 172 for that removable media 49. For robotically controlled removable media storage devices 48 (e.g., an optical disk jukebox or a cartridge tape jukebox), the AML module 190 is responsible for scheduling the mounting of requested medium contained within the storage library. The contents of the storage library are preestablished within a request table 178 in the table structures 160. The request table 174 is scanned for volume serial numbers of the removable medium 49 stored within its storage library, and if the requested volume serial number is found, the AML module 190 will send instructions to the robotic mechanism to remove the indicated removable medium 49 from the storage library if occupied and not active and mount the indicated removable medium 49 on an appropriate secondary storage device 48. The Scan module 192 then senses the presence of the requested removable medium 49 and informs the RM module 182 which completes the open request.

Figure 12:
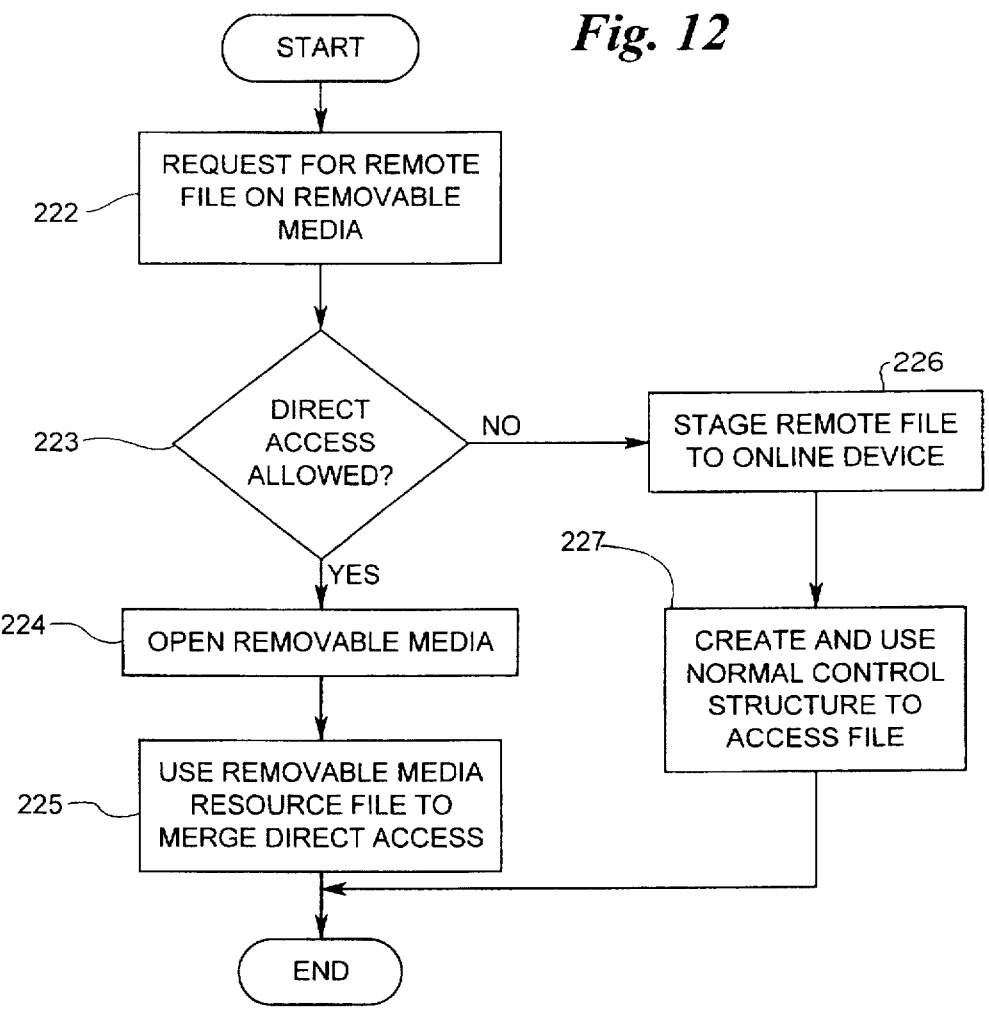
FIG. 12 is a flowchart showing how the archiving file system of the present invention provides for direct access to remote files on removable media without requiring that the remote file be staged onto an online secondary storage device.

The FM module 182 provides for direct access to remote files 42 stored on removable media 49 without the need to stage the entire remote file onto an online secondary storage device 46. Referring now to FIG. 12, in response to a request to read a remote file 42 that is presently stored on a removable media 49 (step 222), the RM module 182 examines the direct access parameter of the file migration attributes 143 (FIG. 7) to determine if direct access to the remote file 42 is allowed (step 223). In the preferred embodiment, for performance reasons direct access is only permitted for removable media 49 which are randomly positionable, such as optical disks. If direct access is allowed, then the RM module 182 issues an open command for the volume serial number as indicated by the archive block pointer 144 (FIG. 7) (step 224). Once the indicated removable media 49 is opened having first been mounted, if necessary, the RM module 182 uses the removable media resource file 194 to manage direct access to the removable media 49 (step 225). If direct access is not allowed, then the RM module stages the remote file on the indicated removable media 49 to an online secondary storage device 46 (step 226) and creates and uses the normal online control structures to manages access to the remote file 42 now staged onto the online secondary storage device 46 (step 227).

Archiving AR Module

The AR module 184 controls the multiple level heterogenous archiving capability of the afs file system, and is also the space manager of the storage space-on the secondary storage devices 46, 48. Each of these functions will be described in turn.

The purpose of the archiving function of the AR module 184 is to automatically backup a remote file 42 by making an archival copy of that file, thereby insuring the integrity of that file in the event of a system crash or other catastrophic error. In the preferred embodiment, up to four different copies of a backup/archive image of a remote file 42 can be created, thereby allowing either the user or the system administrator to control the level of vulnerability associated with the long-term storage of a remote file 32. For example, a first set of remote files 42 may have media residency requirements that require the creation of two separate optical disk copies of the files, whereas a second set of remote files 42 may have media residency requirements that only call for a single tape backup to be created.

The purpose of the space management function of the AR module 184 is to manage the available storage space on the on-line devices 46 to insure that sufficient online storage space is available to allow the network data server 14 to function efficiently. The afs control program 40 maintains two "threshold" values for available storage space on the on-line devices 46 which are defined by the system administrator. When on-line disk space usage exceeds the high threshold the AR module 184 automatically begins to purge or archive remote files 42 that are eligible for elimination or archiving in accordance with their hierarchically selectable archival file attributes 140. The remote files 42 that are eligible for removal or archiving and have waited longest since last access will be eliminated or archived first. This process of removal and archiving continues until online disk space usage falls below the low threshold.

Figure 13:
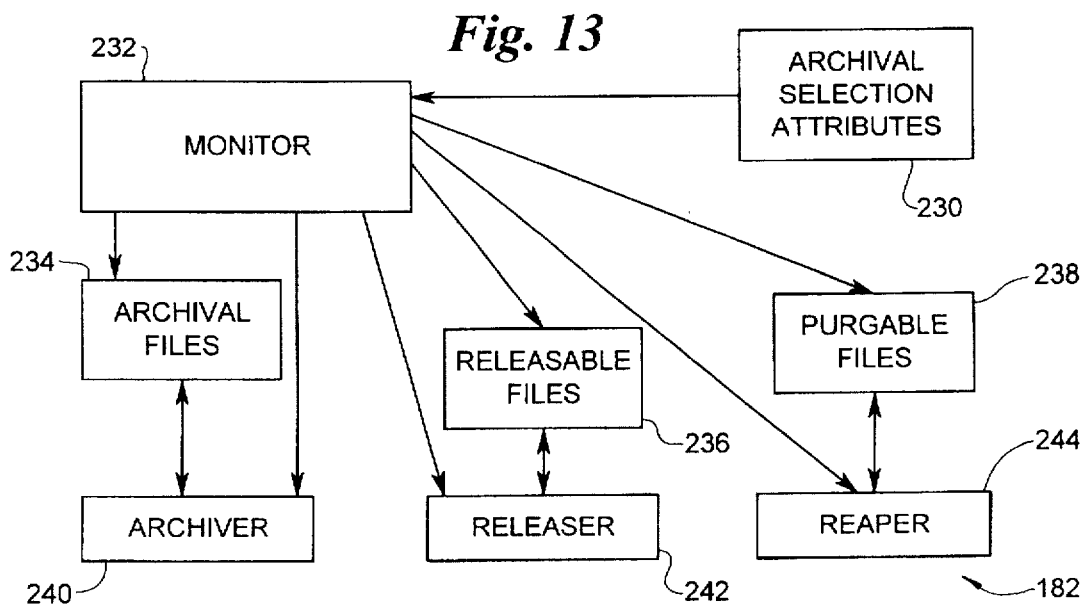
FIG. 13 is a schematic block diagram of the archiving and space management functions of the present invention.

Referring now to FIG. 13, the AR module 184 uses a set of archive selection attributes 230 to automatically control which remote files 42 will be archived or removed in accordance with the hierarchically selectable archival file attribute 140 specified for each remote file 42. In the preferred embodiment, the archive selection attributes 230 are specified by the system administrator for automatic archiving and removal of remote files 42 from the online secondary storage devices 46. The AR module 184 uses the archival file attributes 140 indicated by the hierarchy level 145–149 specified for that remote file. If all selection criteria specified in the selection attributes 230 are met by the file attributes 140 and the file access information 138, then that remote file 42 is eligible for archiving and/or removal. The selection criteria for the preferred embodiment of the archive selection attributes 230 are as follows:

| | |
|---|---|
| Group | Specifies a list of acceptable groups. If the file belongs to any one of the specified groups, it is eligible. |
| User | Specifies a list of acceptable users and is similar to group selection. |
| Life Span | Specifies a range of acceptable life spans. |
| File Size | Specifies a range for file size. |
| Media Residency | Specifies media residency requirements. For example: all files with a first level archive requirement of video. |
| Archive Status | Specifies the archive requirements. For example: all files with an existing first level archive which have not been archived at the second level. |
| Last Access Time | Specifies a range of time since last access. |
| Creation Time | Specifies a range of time for creation. |
| Cycle flag | Specifies whether to consider cycles in the selection process. |
| Cycle Life Span | Specifies a range of acceptable cycle life spans. |
| Search Path Root | Specifies the starting directory for the file search. |
| Archive Size | Specifies a range of acceptable total archive file size when generating the list of files to be archived. Once the maximum limit for a targeted archival media has been reached, the search stops. If the minimum limit has not been reached the archive will not occur. |

Figure 14A:
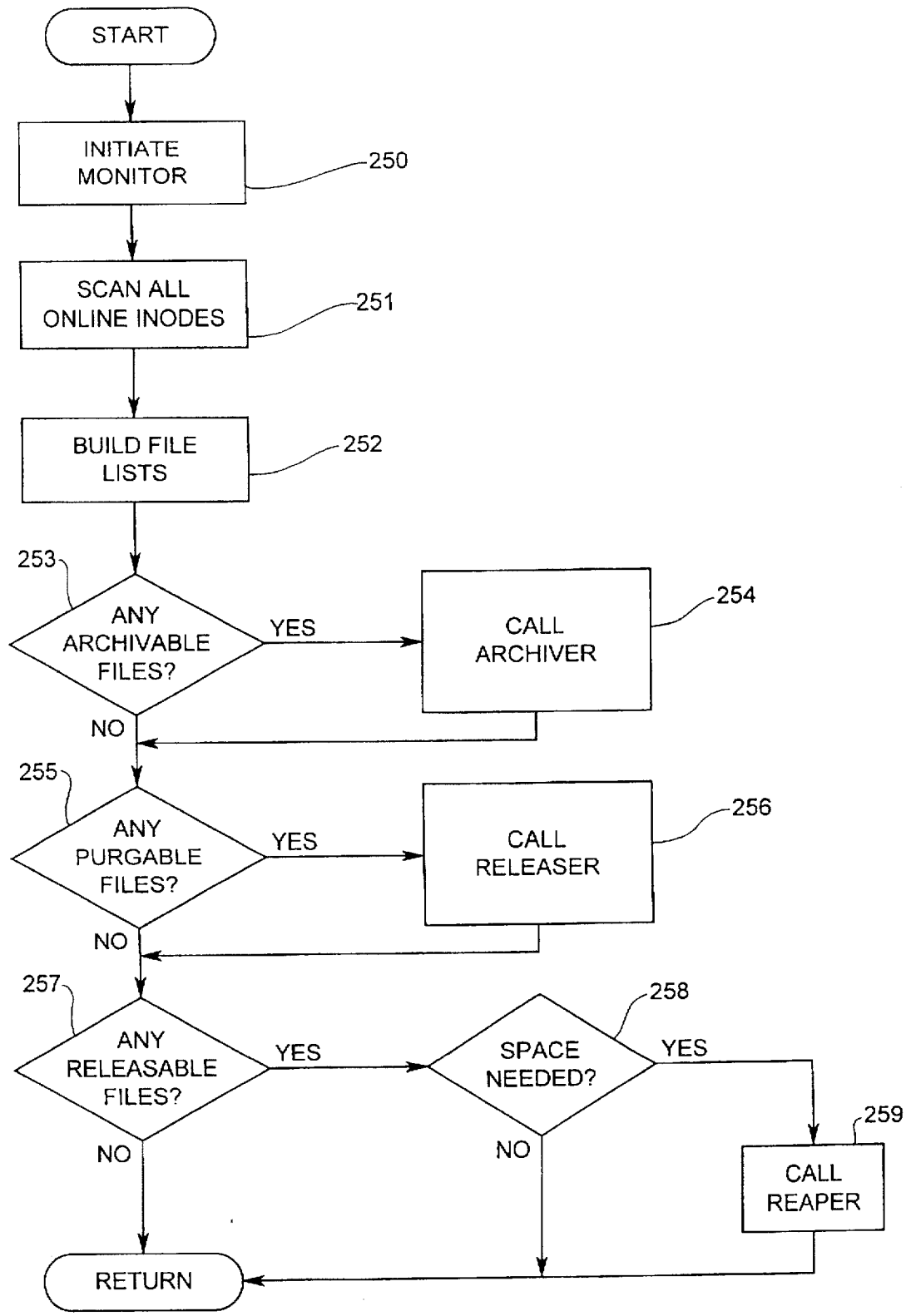
FIGS. 14a, 14b, 14c and 14d are flowcharts of various processes used by the archiving and space management functions shown in FIG. 13.

To accomplish both the archiving function and the space management function, the AR module 184 calls several processes that use the archival file attributes 140 to determine what action to take on remote files 42 resident on the online secondary storage devices 46. These processes are shown in FIG. 13 and FIGS. 14a–14d and may be initiated at scheduled intervals, by the crossing of the high threshold, or by operator action (step 250) (FIG. 14a). FIG. 14a shows the Monitor 232 which scans the inodes 106 for all online storage media 46 and compares the archival selection attributes 230 to the file information 118 (step 251) to build three lists of files (step 252): Archivable Files 234, i.e. files which have not yet been archived and whose file information 118 meets the selection criteria established by the archival selection attributes; Releasable Files 236, i.e., files which have been archived or whose life spans have expired and whose online disk space may therefore be released; and Purgable Files 238, i.e., files whose life spans have expired. Depending on the contents of each list 234, 236 and 238, the Monitor 202 might initiate any or all of the Archiver 240, the Releaser 242 or the Reaper 244 (steps 253–260).

In the preferred embodiment of the afs control program 40, once files have been archived or purged, the on-line disk space they occupy may be quickly released in the event of a large influx of new data. However, remote files 42 are not typically released from on-line storage 46 until the space is needed (step 258), thereby maximizing the possibility that a requested remote file 42 will still be resident on disk 46, rather than requiring that access be made to the removable media 49 to which the remote file 42 was archived.

Figure 14B:
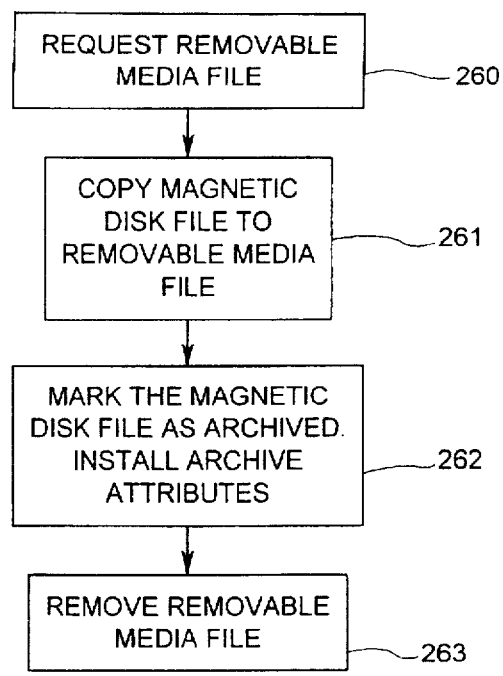

As shown in FIG. 14b, the Archiver 240 creates copies of files for each remote file listed in the Archivable files 234 on the targeted archival media 49 for that file. The targeted archival media 49 is requested (step 260) and the remote file 42 on the online secondary storage device 46 is coped to the removable media file 49 (step 261). Once accomplished, the in core inode 106 for the version of the remote file 42 stored on the online device 46 is marked as archived (step 262) and the removable media file 49 is closed (step 263).

Figure 14C:
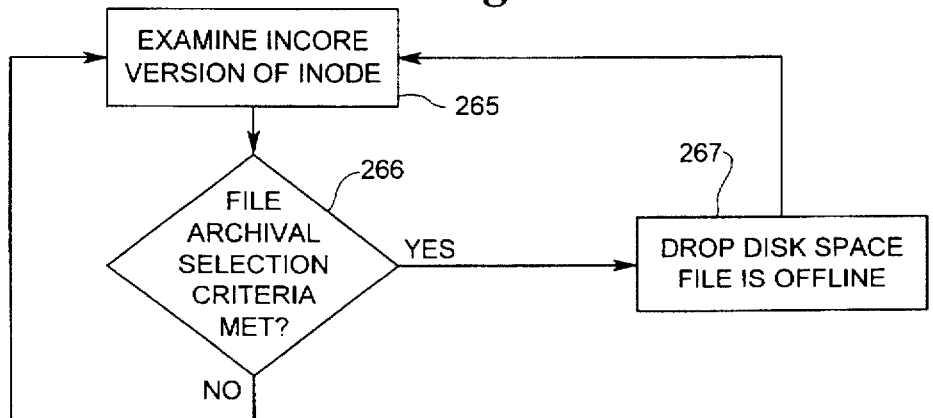

FIG. 14c shows how the Releaser 242 releases the storage space of the online secondary storage device 46 associated with remote files 42. The Releaser 242 examines the in core version of the inode 106 for each file listed on the Releasable files 234 (step 265). If the archival requirements have been met and the remote file 42 has been successfully archived to a removable archival media 49 (step 266), then the disk space is marked as released and the remote file 42 is considered off line (step 267).

Figure 14D:
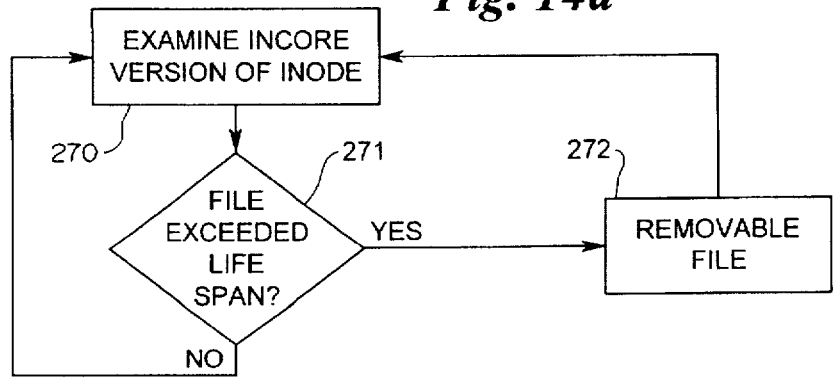

Finally, FIG. 14d shows how the Reaper 244 eliminates from the entire network data server 14 all remote files 42 that have exceeded their life span. The Reaper 244 examines the in core version of the inode 106 for each remote file 42 listed on the Purgable files 238 (step 270). If the file life span parameter in the archival attributes 140 has been exceeded (step 271), the Reaper 244 removes the remote file 42 from the network data server 14 by issuing a remove system call having root permission to remove the remote file 42 (step 272).

File System (FS) module

The FS module 186 manages the control information for all of the file trees 44 that are mounted on and controlled by a particular instance of the file control program 40, as well as determining the logical addresses for all remote files 42 stored on those file trees 44. It will be recognized that when there are multiple file processors 58 within the network data server 14, multiple instances of the file control program 40 will be executing simultaneously, one in each file processor 58. Within each afs control program 40, the FS module 186 keeps track of which file trees 44 are mounted for that archiving file system using information in the mount table 162 that is accessed by the FS module 186.

In managing the control information for the file trees 44, the FS module 186 acts primarily in response to directory and inode management commands from the host processor 56. Basically, these directory and inode management commands are similar in function to the System V directory and inode management commands as described in Bach, M., *The Design of the Unix® Operating System*, (1986), Prentice Hall, Chpt. 4, pp. 60–98. A list of functions performed by FS module include:

| | |
|---|---|
| Get inode | Create a new inode 106. |
| Free inode | Release the inode 106 for a remote file 42 as a result of removal of the file 42 corresponding to the inode 106. |
| Read inode | Read an inode 106 based on a given inode number. |
| Write inode | Update an inode 106 based on a given inode number. |
| Create Dir | Create a new directory file. |
| Remove Dir | Release a directory file as a result of the removal of that directory from the file tree 44. |
| Read Dir | Read a directory file, either as part of a pathname lookup, or in response to a DIR command from a user. |
| Write Dir | Update a directory file. |
| Mount | Mount the file tree (see description in IO module section) |
| Sync | Update control information from cache buffer to disk, as described in co-pending application entitled "METHOD AND APPARATUS FOR FILE RECOVERY FOR SECONDARY STORAGE SYSTEMS" |

Storage Family Sets

Figure 15:
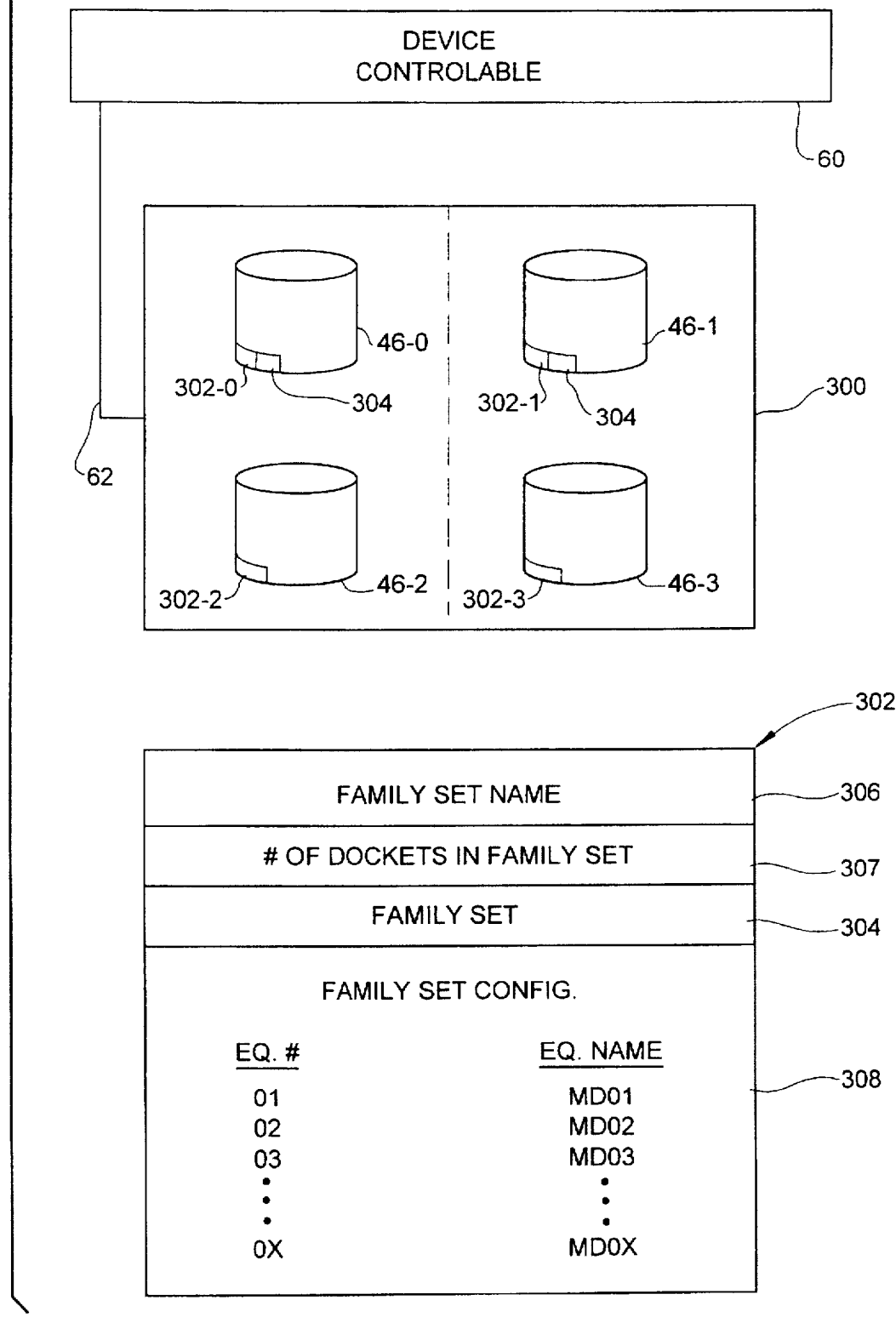
FIG. 15 is a block diagram of a storage family set in accordance with the present invention.

The preferred embodiment of the FS module 186 supports remote files 42 that can be stored on online secondary storage devices 46 that are organized as storage family sets. Unlike prior art file systems that restricted file trees 29, 38 to a single physical online secondary storage device, the afs control program 40 of the present invention can establish a file tree 44 which can exist on multiple physical online secondary storage devices 46. FIG. 15 shows a block diagram depiction of a storage family set 300 in accordance with the preferred embodiment of the afs control program 40. The storage family set 300 is unlike prior art multiple disk storage devices, such as a redundant array of inexpensive disks (RAID) devices, which appear to the standard file interface 24 as a single physical storage device. Instead, the logical allocation units for assigning disk blocks are allowed to span multiple physical devices on a block-by-block basis as described below in manner that is equivalent to, but different than, RAID level zero striping. As a result, the effective data transfer rates which can be sustained are directly related to the number of online secondary storage devices 26 and device controllers 46 which are operating in parallel in the data server.

FIG. 13 shows a block diagram of a typical storage family set 300. A label sector 302 is defined on each disk drive 46 to identify the storage family set 300 of which that particular disk drive 46 is a member. For the first two disks in the family set 300, the next sector 304 is used to store the control information that is backed up in accordance with the sync point procedures previously described. As part of the label sector 302, an ordinal number 304 is assigned for that disk drive 46-0, 46-1, 46-2, 46-3, within the storage family set 300. The label sector 302-0, 302-1, 302-2 and 302-3 also contains the equipment topology of the entire storage family set 300 at the time the set 300 was created by the system administrator, or when one or more additional disk drives 46 were last added to the set 300. The equipment topology will include a family set name 306, the number of disk in the family set 307, the family set as defined by the ordinal number 304, and the family set configuration 308. A program listing for the data fields of the preferred embodiment of the family set label sector is included as Appendix A-10.

In the preferred embodiment, the size of the small and large disk allocation units remains constant and is independent of the number of disk drives 46 in the storage family set 300. Additional disk drives 46 can be added to a storage family set at any time. The membership ordinal number 304 of any added disk drive 46 will be unique for that particular storage family set 300. The extent array 120 in the control portion of the afs file structure 100 not only points to a disk block 104 as a disk sector, but also identifies the disk block 104 by including the family set ordinal 304 as part of the extent array 120.

The equipment topology is informational and is not required for usage of the storage family set 300 by the afs control program 40. It does, however, allow individual disk drives 46 to be moved from file tree 44 to file tree 44, or be reconfigured on different equipments. All that is required for the file tree 44 containing the storage family set 300 to be mounted by the afs control program 40 is the presence of all members of the set 300. Should a member in the set become non-functional (i.e. data stored on the disk drive 46-1 becomes unreadable), recovery operations within the afs control program 40 will correct all index references to the defective disk drive 46-1 and a new disk drive 46-4 (not shown) can be added to the storage family set 300 in place of the defective disk drive 46-1. In this case, the replacement disk drive 46-4 will have the same membership ordinal number as the replaced disk drive.

Striping and Shadowing

The FS module 186 makes use of the storage family sets 300 to support software striping. When a remote file 42 is created on a storage family set 300, the disk blocks 104 assigned to that remote file 42 may exist on any disk drive 46-0, 46-1, 46-2, 46-3 within the storage family set 300 associated with the file tree 44 on which the remote file 42 is to be stored. Blocks for the remote file 42 are assigned to m storage family set 300 on a forward-end around basis (i.e., round robin). However, should a particular disk drive, disk drive 46-1 for example, become full, the disk block 104 to be stored will be allocated space on the next disk drive, disk drive 46-2, in the round robin sequence. Thus, it is not a requirement for striped files to exist with a rigid disk assignment order as is the case prior art disk striping techniques, such as RAID.

In the example shown in FIG. 15, four separate disk drives 46-0, 46-1, 46-2 and 46-3 are defined as a storage family set 300. When a remote file 42 is to be stored on the storage family set 300, the afs control program 40 allocates the necessary number of logical disk blocks 104 on a round robin basis starting with drive 46-0 and proceeding forward to drive 46-3. The afs control program 40 would allocate the blocks of a file having twelve total blocks such that blocks 0, 4 and 8 are stored on disk drive 46-0; blocks 1, 5, and 9 are stored disk drive 46-1; blocks 2, 6 and 10 are stored on disk drive 46-2; and blocks 3, 7 and 11 are stored on disk drive 46-3. For striped files, the next disk to be allocated a disk block is computer as follows:

```
next_disk = (current _disk + 1) modulo number_of disks      1.
current _disk = next_disk
if (space not available on current_disk) goto 1
```

The afs control program 40 is also capable of automatically creating a shadow file using the storage family set 300. In this case a shadow file or second image of the remote file 42 is created in parallel with each original data image being stored. The afs control program 40 allocates half of the disk drives in a storage family set, disk drives 46-0 and 46-2 as shown on the left half of the clotted line for example, to store original data, and the remaining half, disk drives 46-1 and 46-3, is used to store the shadow file, thereby providing an automatic level of online storage redundancy. In the preferred embodiment, the disk drives 46 are interleaved with the original image being stored on the even number disk drives 46-0 and 46-2, and the shadow image being stored on the odd number disk drives 46-1 and 46-3. Use of this approach allows the afs control program 40 to easily support concurrent striping and shadowing of remote files 42 without requiring any additional software or hardware controls. It will be seen that, as long as disk drives 46 are added to a storage family set 300 in pairs, the storage family set 300 can be expanded at any time.

In the example of a storage family set 300 comprised of four disk drives as shown in FIG. 15, drives 46-0 and 46-2 could be the primary storage set for storing files, and drives 46-1 and 46-3 could be the shadow storage set for automatically storing the shadow copy of the files. For striped and shadow files, the next disk to be allocated a disk block is computed as follows:

```
next_disk = (current _even_disk +2) modulo number_of _disks    1.
current_even_disk = next _disk
if (Space not available on current_even disk) Goto 1 next_disk = (current_odd_disk +2) modulo number_of _disks      2.
current_odd_disk = next_disk
if (space not available on current_odd_disk) goto 2
```

Input/Output (IO) Module

The IO module 188 performs the operations for the actual remote file commands, such as mount, open, read, write, etc. FIGS. 16a–16f are flowcharts describing showing how these file commands are implemented.

Figure 16A:
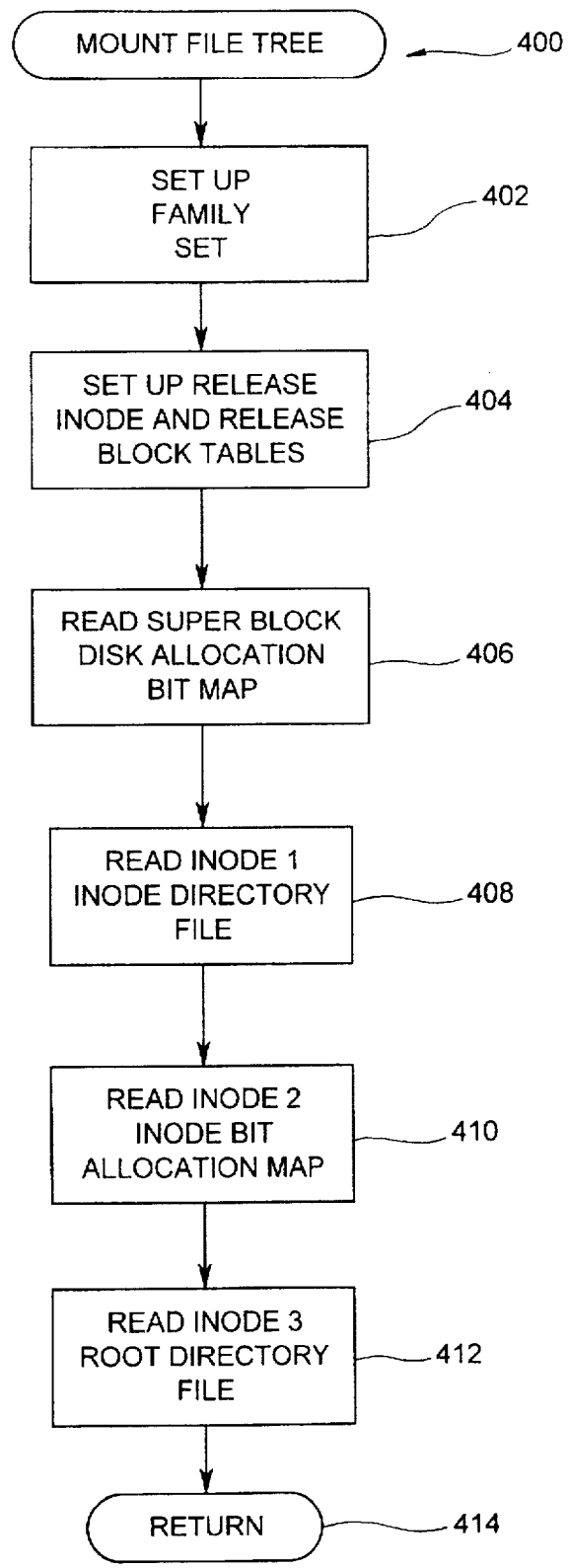
FIGS. 16a, 16b, 16c, 16d, 16e and 16f are flowcharts showing how various file commands are implemented by the archiving file system of the present invention.

FIG. 16a shows the steps for a mount command 400 to a mount a file tree 44 on the data server 14. First, the family storage set 300 for the file tree 44 is configured (step 402). Then the release inode table 174 and release block table 176 for that file tree are created in the data structures 160 (step 404). THe super block 102, including the disk block allocation bit map 110 are read in from the secondary storage device on which the file tree 44 is resident (step 406). Then the first three inode files, 106-0, 106-1 and 106-2 are read into a cache buffer established by the buffer manager module 180 for the control information for the file tree 44 (steps 408, 410 and 412). Once this control information is available to the afs file control program 40, the file tree 44 is mounted and a response to the mount command is returned to the user (step 414).

Figure 16B:
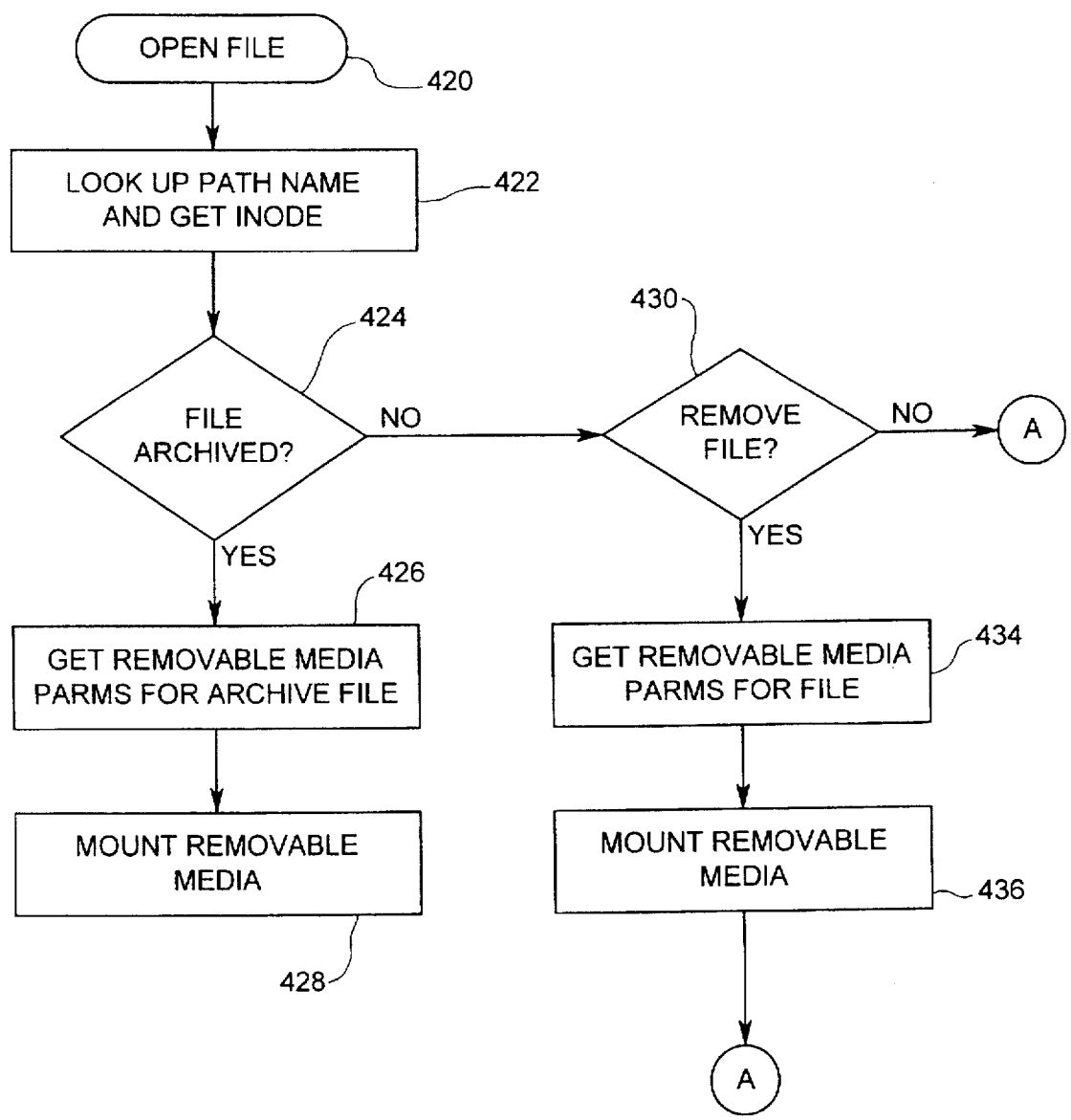

FIG. 16b shows the steps for an open file command 420 to open a remote file 42 on the file tree 44. First, the 10 module 188 looks up the pathname for the remote file 42 and obtains the inode 106 for remote file 42 (step 422). If the inode 106 is in core already, for example because another file 42 having its inode 106 in the same logical block 104 is already in core, then the inode 106 is marked as open. Otherwise, the IO module reads the inode 106 from the secondary storage device 46 (all inodes 106 are maintained on the online disk drives 46) and creates an in core version of the inode 106 in the cache buffer for the control information for the file tree 44. If the file 42 is archived (step 424), the IO module 188 gets the removable media resource file 194 for the file 42 (step 426) and call the RM module 182 to mount the removable media 49 (step 428). If the file 42 is not archived, a check is made to see if the file 42 is a resource file (430). If not, the remote file 42 is a regular file and no additional processing is necessary by the IO module 188 to open the file (432). If the remote file 42 is a resource file, then again the removable media resource file 194 is acquired (step 434) and the removable media 49 is mounted (step 436) before returning to the user. For any archived files, a further check is made to see if direct access is allowed for the archive file (step 438). As previously described in the description of the RM module 182, if direct access is not allowed, an additional step of staging the file from a removable media storage device 46 to an online storage device 46 must be performed (step 439).

Figure 16C:
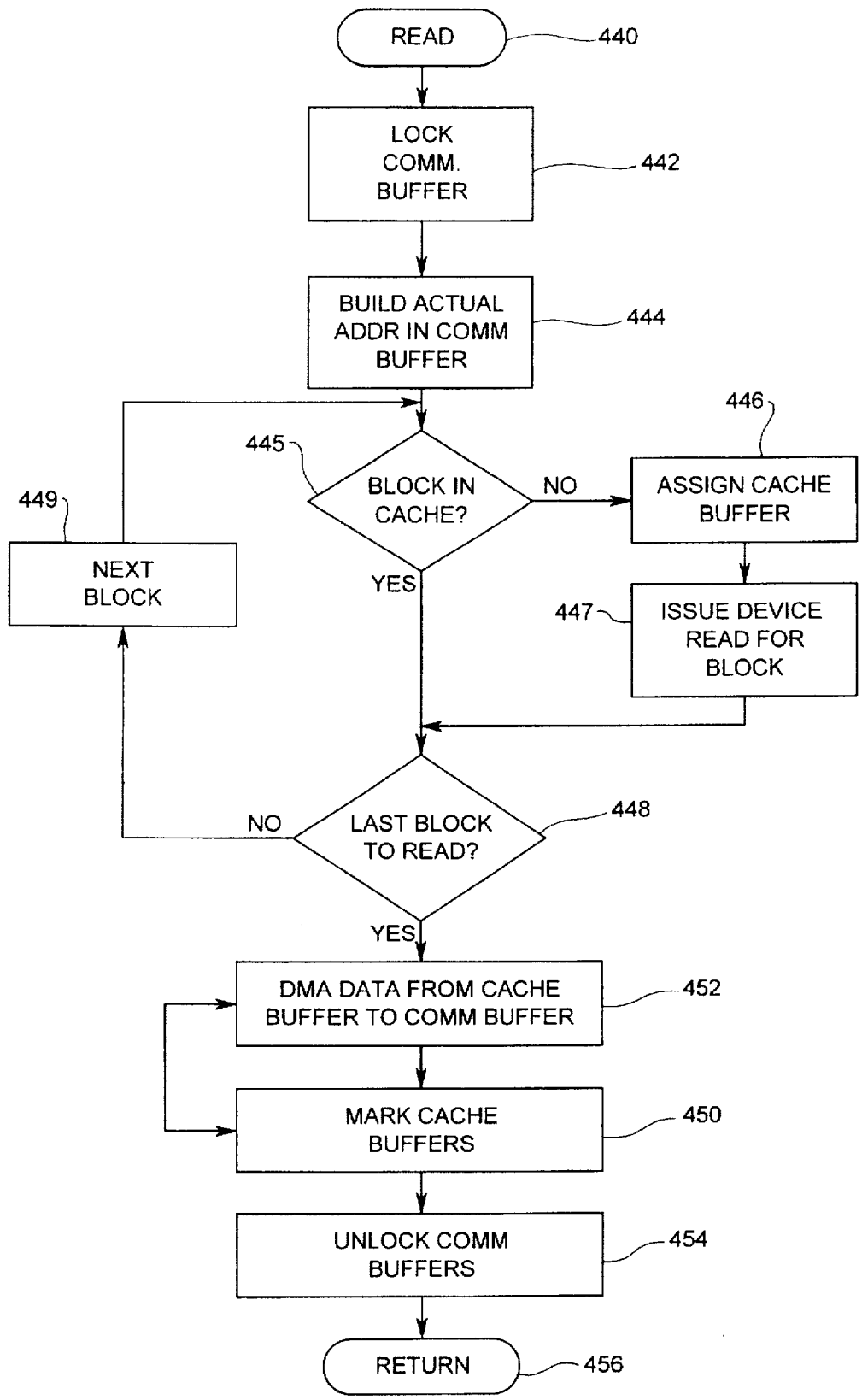

FIG. 16c shows the steps for a read command 440. The first step is to lock the communication buffers which have been assigned to service the remote file request (step 442). Depending upon how the request is made (e.g., NFS or FTP), the communication buffers may be assigned in the communication processor 54 or the host processor 56. The next step is to determine the actual address within the communication buffer that is being accessed by this read command (444). For each block 104 that must be read to satisfy the read command 400, a loop is made to see if that block 104 is already in a cache buffer and, if not a cache buffer is assigned and the block 104 is read from the device, until all blocks 104 for the read are in cache buffer (steps 445–449). Once the blocks 104 are all in the cache buffer, the cache buffer are marked as in cache (step 450) and the data is then transferred by DMA from the cache buffer defined the buffer memory 64 to the communication buffer (step 452). Finally, the communication buffers are unlocked (step 454) and the read command is completed (step 456).

Figure 16D:
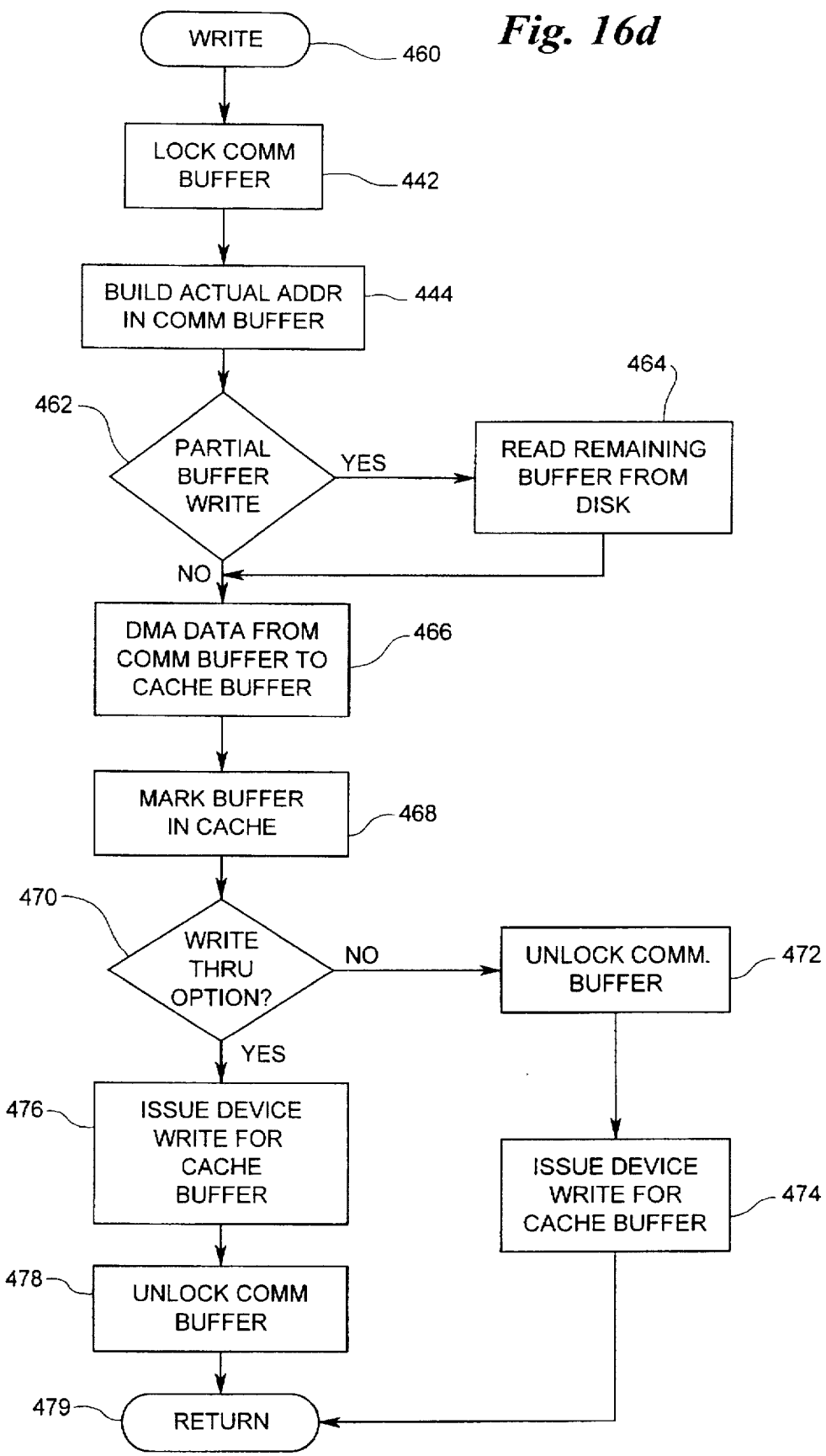

FIG. 16d shows the steps for a write command 460. The first two steps (steps 442 and 444). A check is made to see if a partial buffer is being written (step 462). If so, the remaining portion of the buffer must be read in from the de-vice before the entire buffer can be written out (step 464). Once the entire buffer is ready to be written, the buffer is transferred by DMA from the communication buffer to the cache buffer defined in the buffer memory 64 (step 466) and the cache buffer is marked as in cache (step 468). A check is made to see if the write through option is set (step 470). If not, the communication buffers can be unlocked (step 472) before the cache buffer is written to the device (step 474). Otherwise, the cache buffer is written to the device (step 476) and then the communication buffer is unlocked (step 478) before the write command is completed (step 479).

Figure 16E:
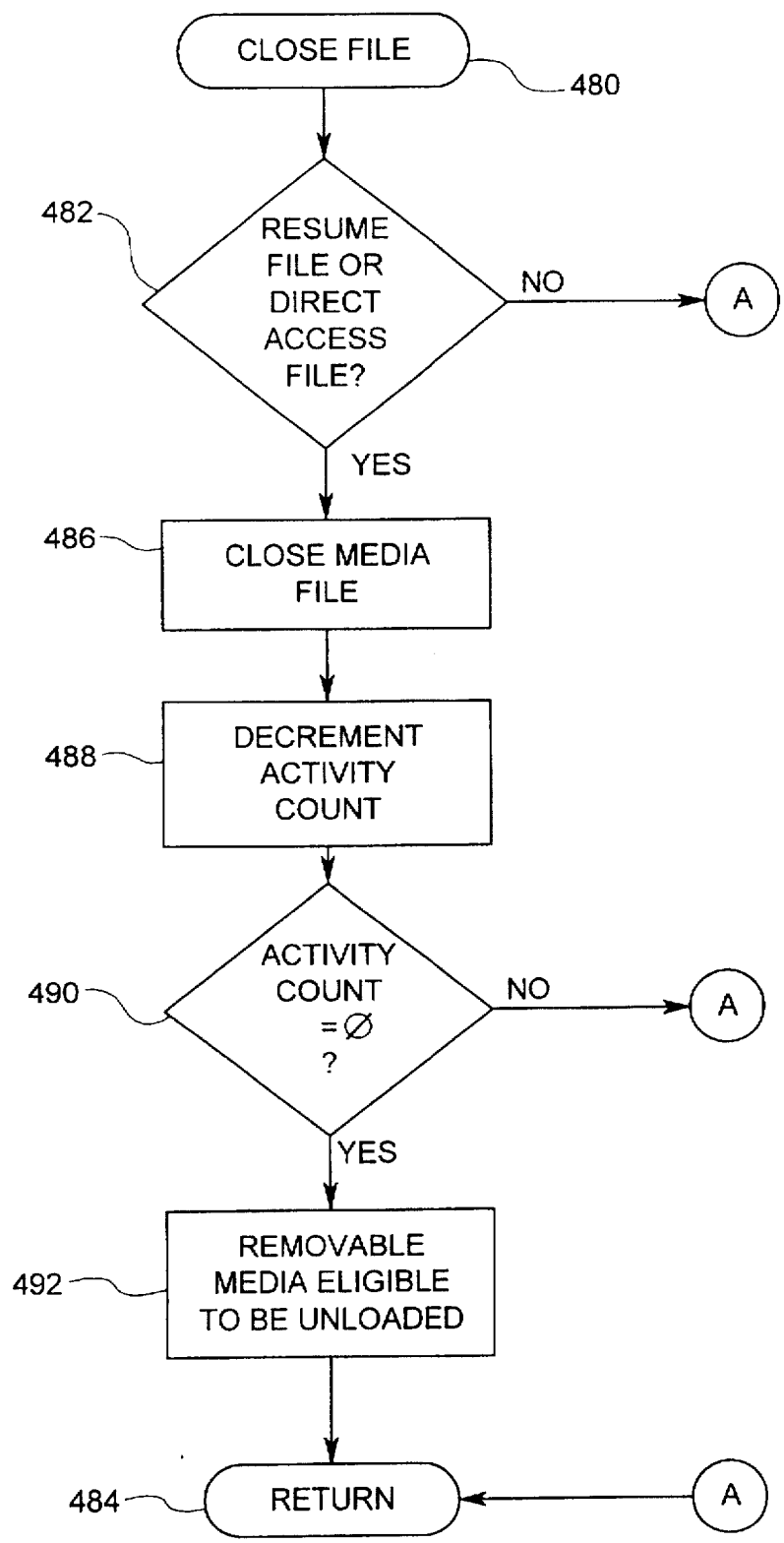

FIG. 16e shows the close file command 480. A check is made to see if the remote file 42 is a resource file or a direct access file (step 482). If not, the file is marked as closed and the IO module returns (step 484). If the file is a resource file or a direct access file, the media file is closed (step 486). An activity count for the particular removable media 49 is decremented (step 488). If the activity count for that removable media 49 is zero (step 490), then the removable media 49 can be unloaded (step 492) before returning (step 484).

Figure 16F:
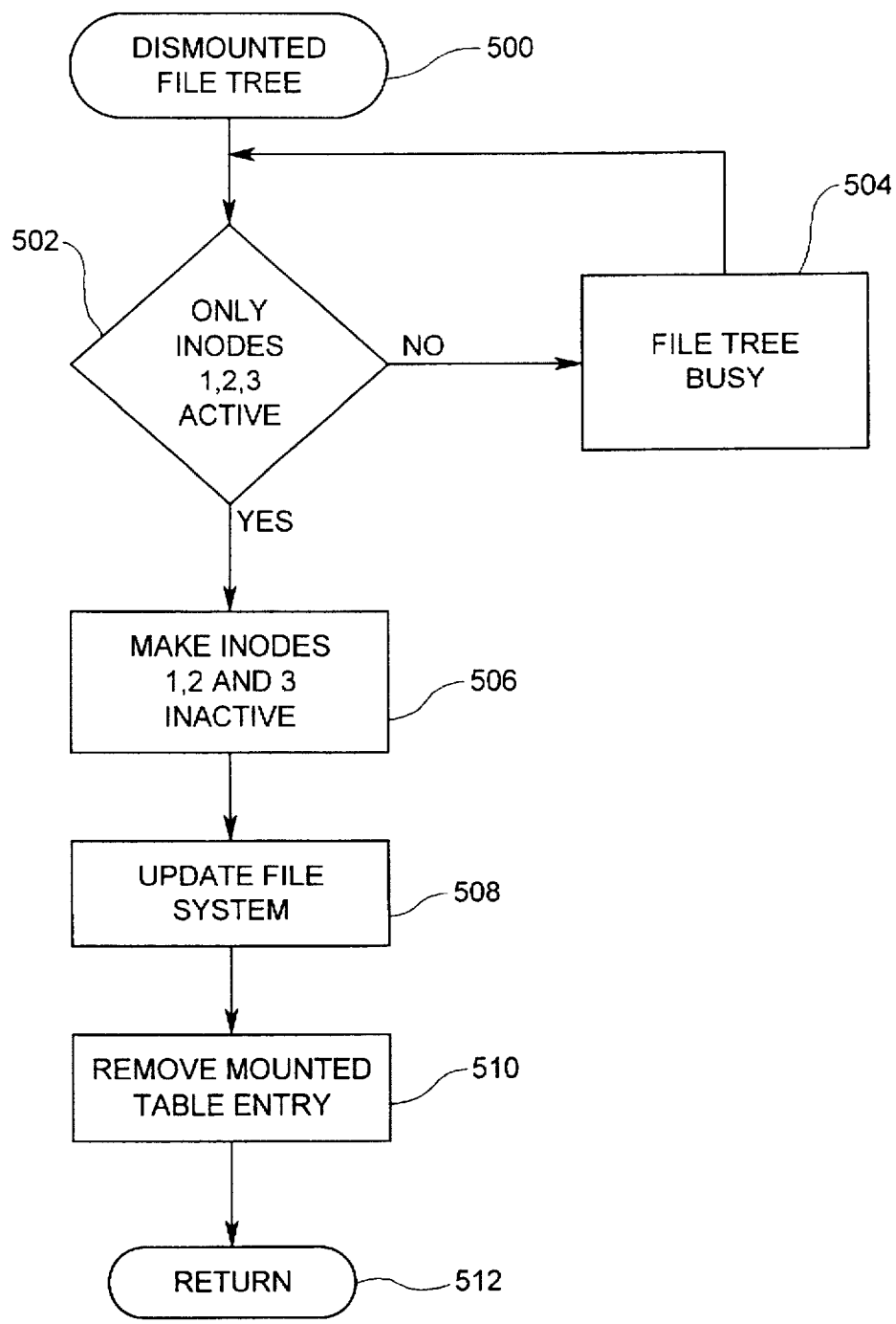

FIG. 16f shows the dismount command 500 for dismounting a file tree 44. When an attempt is made to dismount a file tree 44, a check is made to see that only inodes 106-0, 106-1 and 106-2 are the only active inodes for that file tree 44 (step 502). If not, then a message is returned indicating that the file tree 44 is still busy (step 504). If the file tree 44 is not busy, then inodes 106-0, 106-1 and 106-2 are marked as inactive (step 506). To insure correctness of the control structure, a sync point of the file system is forced (step 508) after which the file tree 44 is removed from the mount table 162 (step 510) before returning (step 512).

Although the description of the preferred embodiment has been presented, it is contemplated that various changes could be made without deviating from the spirit of the present invention. Accordingly, it is intended that the scope of the present invention be dictated by the appended claims, rather than by the description of the preferred embodiment.

What is claimed is:

1. A file system that is part of an operating system program executing in a distributed computer processing network having a plurality of computer processors operably connected to one or more data servers each comprised of a remote secondary storage system for storing one or more remote files of data information for which space is dynamically allocated as needed by the file system for the one or more remote files of data information, the file system comprising:

control structure means for each data server for storing control information for each remote file stored on that data server, the control structure means including:
preallocated control structures including a file tree control block, a disk block allocation map, a file pointer block bit allocation map and a file pointer block directory for each file tree stored on that data server, all of which are stored in preassigned locations on the data server; and
dynamically allocated control structures including at least one file pointer block means for storing control information, including data block pointer information, for at least one remote file, all of the file pointer block means being stored on the data server as addressable control files having space on the secondary storage system that is dynamically allocated in the same manner in which space is allocated for the one or more remote files of data information;

directory structure means for each data server for storing an identifying name for each remote file stored on that data server and a pointer to control information stored in the control structure means that is unique to that remote file; and program means for responding to a plurality of file requests from one or more computer programs executing on the distributed computer processing network to operate on an indicated one of the remote files by selectively accessing the directory structure means and the control structure means for the data server on which the remote file is stored based on a set of hierarchically selectable archival attributes and utilizing the file pointer block means associated with the indicated one of the remote files to obtain access to the control information and the data information for the indicated one of the remote files.

2. The file system of claim 1 wherein the file pointer block means comprises:
file information for at least one remote file; and
disk address extent array means for at least one remote file for storing an array of pointers to a sequence of logical blocks that is dynamically defined on the data server where the data information is stored for that remote file.

3. The file system of claim 2 wherein each file pointer block means contains file information and disk address extent array means for two or more remote files.

4. The file system of claim 1 wherein the control structure means defines separate control information for each remote file and wherein the file pointer block means comprises:
attribute means for storing a set of hierarchical attributes associated with the remote file.

5. The file system of claim 4 wherein one of the selectable hierarchical attributes includes a file lifespan attribute that defines a length of time after which the remote file is automatically deleted from the data server.

6. The file system of claim 4 wherein one of the selectable hierarchical attributes includes a cycle attribute that defines a number of versions of a remote file which will be created and maintained on the data server each time a new version of the remote file is stored.

7. The file system of claim 4 wherein the data server includes at least one short-term direct access storage devices and at least one long-term, randomly positionable, removable media archive storage devices and wherein the program means uses the archive storage devices to automatically archive remote files stored on the direct access storage devices as archive files stored on the archive storage devices in accordance with selected ones of the selectable hierarchical attributes assigned to a remote file being archived, the existence and location of the archive files being stored as control information in the control structure means for the file tree.

8. The file system of claim 7 wherein the program means selectively directly accesses an archive file by reading blocks of data information directly from the archive storage devices based on an RM module examining direct access parameter of said archive file to determine direct access to said archive file thereby circumventing staging the archive file onto a direct access storage device in the data server before the data information is transferred to a computer program in response to a file request.

9. The file system of claim 7 wherein at least one of said data servers has a plurality of direct access storage devices that are organized as a storage family set comprising a plurality of physically unique direct access storage devices that are collectively accessed by the program means on a block-by-block basis and wherein the program means implements software striping by arranging a plurality of blocks comprising a remote file stored on the storage family set to be stored with selected ones of the blocks stored in their entirety on separate ones of the physically unique direct access storage devices.

10. The file system of claim 9 wherein the storage family set comprises at least two direct access storage devices and wherein the program means implements software shadowing by selectively storing a shadow copy of a remote file by partitioning the storage family set into la a pair of storage family subsets, each storage family subset having an equal number of secondary storage devices and automatically storing the plurality of blocks comprising the remote file on each of the pair of storage family subsets.

11. A file system that is part of an operating system program executing in a distributed computer processing network having a plurality of computer processors operably connected to one or more data servers each comprised of a remote secondary storage system for storing one or more remote files of data information, at least one of the data servers including one or more short-term direct access storage devices and one or more long-term, randomly positionable, removable media archive storage devices, the file system comprising:

control structure means for each data server for storing separate control information for each remote file stored on that data server, the control information for each remote file including:
   attribute means for storing a set of hierarchical attributes associated with the remote file;
   disk address extent array means for storing an array of pointers to a sequence of logical blocks that is dynamically allocated on the data server where the data information for the remote file is stored on the direct access storage devices;
   archive record means for storing control information for the remote file when the data information for the remote file is stored on the removable media archive storage devices;
   directory structure means for each data server for storing an identifying name for each remote file stored on that data server and a pointer to the control information unique to that remote file; and
   program means for responding to each of a plurality of file requests from one or more computer programs executing on the distributed computer processing network to operate on an indicated one of the remote files by selectively accessing the directory structure means and the control structure means for the data server on which the remote file is stored in order to obtain access to the control information and the data information for the indicated one of the remote files, the program means including:
      means for automatically archiving remote files stored on the direct access storage devices as archive files stored on the archive storage devices in accordance with selected ones of the hierarchical attributes stored in the attribute means of the control information of a remote file being archived.

12. The file system of claim 11 wherein the program means directly accesses an archive file by reading blocks of data information directly from the archive storage devices, based on an RM module examining direct access parameter of said archive file to determine direct access to said archive file thereby circumventing staging of the archive file onto a direct access storage device in the data server before the data information can then be transferred to a computer program in response to a file request.

13. The file system of claim 12 wherein the storage family sets comprises at least two direct access storage devices and wherein the program means implements software shadowing by selectively storing a shadow copy of a remote file by partitioning the storage family sets into a pair of storage family subsets, each storage family subsets having an equal number of secondary storage devices and automatically storing the plurality of blocks comprising the remote file on each of the pair of storage family subsets.

14. The file system of claim 12 wherein a unique ordinal number is assigned to each of the plurality of direct access storage devices in the storage family sets and the ordinal numbers are stored in the control structure means for each data file.

15. The file system of claim 12 wherein a label sector is stored on each of the plurality of direct access storage devices identifying that device as a member of one of a particular storage family sets.

16. The file system of claim 14 wherein additional direct access storage devices are added to one of said storage family sets by rewriting the label sector for each of the plurality of direct access storage devices for one of said particular storage family sets.

17. A file system that is part of an operating system program executing in at least one computer processor operably connected to at least one data server, at least one of the data servers including a plurality of direct access storage devices that are organized as at least one storage family sets, each of said at least one storage family sets comprising a plurality of physically unique direct access storage devices, the file system comprising:
   control structure means for each data server for storing separate control information for each data file stored on that data server;
   directory structure means for each data server for storing an identifying name for each data file stored on that data server and a pointer to the control information unique to that data file;
   program means for responding to each of a plurality of file requests from one or more computer programs executing on the at least one computer processor to operate on an indicated one of the data files by selectively accessing the directory structure means and the control structure means for the data server on which the data file is stored in order to obtain access to the control information and the data information for the indicated one of the data files, the program means including:
      means for collectively accessing said at least one storage family sets on a block-by-block basis and implementing a software striping of a data file across the storage family sets by arranging a plurality of blocks comprising the data file stored on the storage family sets to be stored with selected ones of the blocks stored in their entirety on separate ones of the physically unique direct access storage devices.

* * * * *